(12) United States Patent
Cansler et al.

(10) Patent No.: US 8,370,201 B2
(45) Date of Patent: *Feb. 5, 2013

(54) SYSTEM AND METHOD FOR PRESENTING PRIORITIZED ADVERTISING DATA IN A PICTURE IN PICTURE DISPLAY WINDOW DURING EXECUTION OF VIDEO TRICK PLAY COMMAND DATA

(75) Inventors: James L. Cansler, Cedar Park, TX (US); Charles Scott, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/164,231

(22) Filed: Jun. 30, 2008

(65) Prior Publication Data

US 2009/0325713 A1 Dec. 31, 2009

(51) Int. Cl.
*G06Q 30/00* (2006.01)
*G05B 19/418* (2006.01)

(52) U.S. Cl. .......................... 705/14.4; 709/204; 725/34

(58) Field of Classification Search ................. 709/204; 725/34
See application file for complete search history.

(56) References Cited

U.S. PATENT DOCUMENTS

| | | | |
|---|---|---|---|
| 6,698,020 B1 * | 2/2004 | Zigmond et al. | 725/34 |
| 2001/0027475 A1 * | 10/2001 | Givol et al. | 709/204 |
| 2003/0037330 A1 | 2/2003 | Makofka | |
| 2003/0093790 A1 * | 5/2003 | Logan et al. | 725/38 |
| 2004/0003398 A1 * | 1/2004 | Donian et al. | 725/34 |
| 2006/0080167 A1 * | 4/2006 | Chen et al. | 705/14 |
| 2006/0222321 A1 | 10/2006 | Russ | |
| 2006/0222335 A1 | 10/2006 | Russ | |
| 2008/0120668 A1 | 5/2008 | Yau | |

OTHER PUBLICATIONS

Concurrent Ad Insertion Solution Patent Maintains Advertisement Integrity, While Simultaneously Supporting Full Functionality for On-Demand Content. Jun. 14 , 2004. SCTE Cable-Tec Expo 2004. Atlanta & Orlando, Fla.—(Business Wire)—Jun. 14, 2004.*

* cited by examiner

*Primary Examiner* — Victoria Vanderhorst
(74) *Attorney, Agent, or Firm* — G. Michael Roebuck

(57) ABSTRACT

A computer readable medium is disclosed containing computer executable instructions that when executed by a computer perform a method, the method including but not limited to receiving trick play command data at an end user device; receiving a advertising data at the end user device; correlating the advertising data with penetration data for an end user associated with the end user device; prioritizing the advertising data for the end user device based on the correlation; and presenting a portion of the advertising data in a picture in picture display window on the end user device based on the prioritizing of the advertising data during execution of the trick play command data. A system is disclosed that is useful in performing the method. A data structure embedded in a computer readable medium is disclosed that contains data used by the system and method.

18 Claims, 13 Drawing Sheets

SYSTEM AND METHOD FOR PRESENTING PRIORITIZED ADVERTISING DATA IN A PICTURE IN PICTURE DISPLAY WINDOW DURING EXECUTION OF VIDEO TRICK PLAY COMMAND DATA

FIELD OF THE DISCLOSURE

The present invention relates to the field of targeted advertising data presentation during the execution of trick play video command data.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements.

Advertisements are a component in digital video services, including live or pre-recorded broadcast television (TV), special or pay-per-view programming, video on demand (VOD), and other content choices available to subscribers.

DETAILED DESCRIPTION

Figure 1:
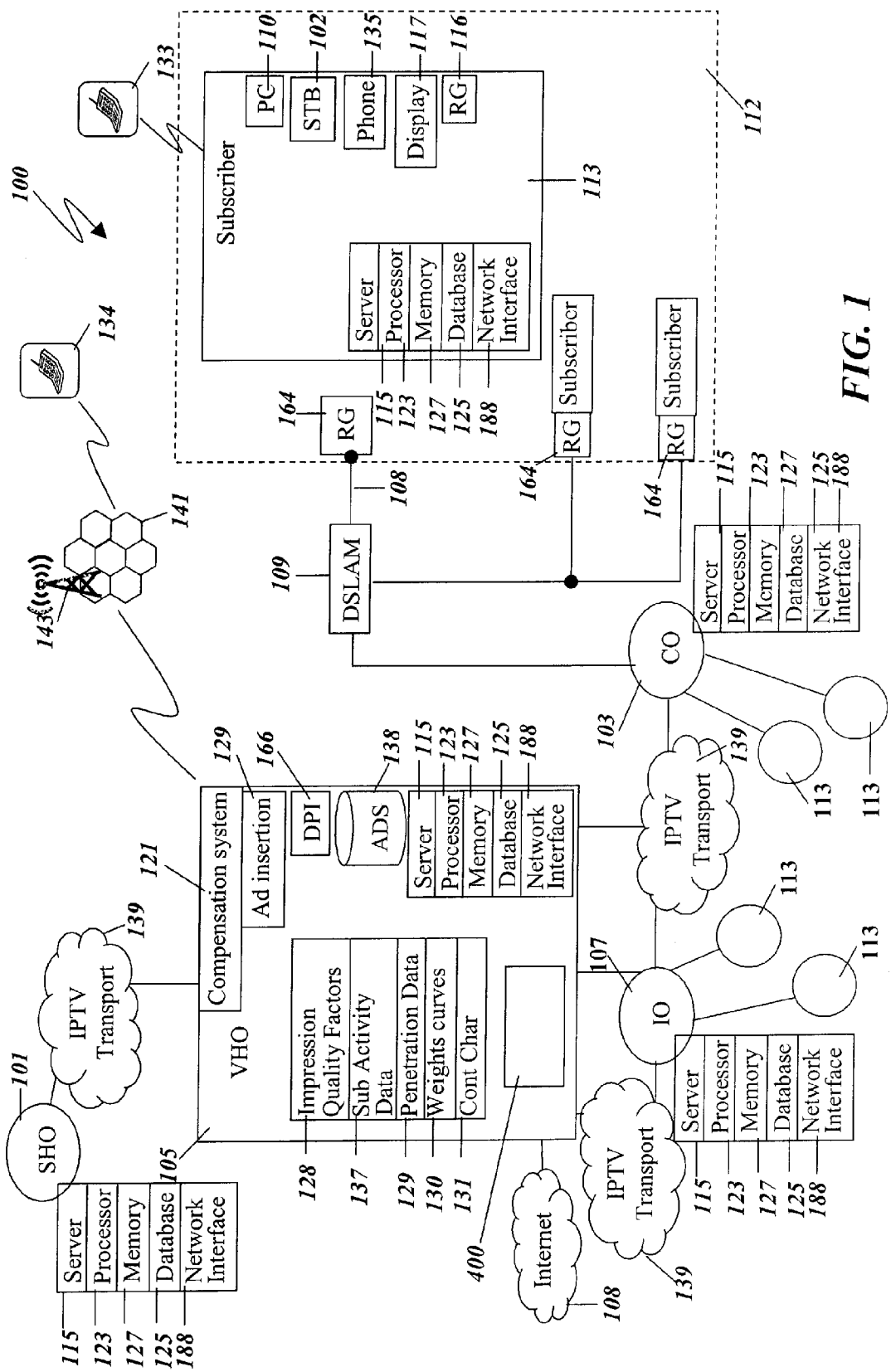
FIG. 1 depicts an illustrative embodiment of a system for presenting prioritized advertising data and monitoring data sent and received by various subscriber devices associated with a subscriber for monitoring advertising impression quality factors data and to estimate penetration for the advertising data and end users associated with video data presentation devices.

An illustrative embodiment provides a digital video recorder (DVR) interface wherein a video data presentation system such as a set top box (STB) and video display or DVR and video display, that presents alternative advertising data during execution of trick play commands on the DVR, STB or other video presentation system controller. Trick play command data are issued by an end user using a remote control (RC) associated with the DVR, STB or other video presentation system. Trick play command data include but are not limited to trick play command data indicative of fast forward, rewind, skip forward, etc. commands to the video data presentation system. In another illustrative embodiment, advertising data is prioritized so that during execution of the trick play command data at the DVR, STB or other video presentation system, the advertising data is presented in prioritized order. In another particular embodiment, a single prioritized advertising data item (also referred to as an advertisement) is presented during trick play command data execution. In another particular embodiment, advertising data is prioritized based on penetration data for advertising data types for particular end users.

Prioritized advertising enables advertisers to target their specific market based on the programs that are available and based on the end users whom are watching the programs. For example, beer companies prioritize commercials to be played during football games because they believe that their target audience will be drinking beer and watching football at that time. While this may work well for beer companies, other advertisers, with a less predictable target behavior may be in a precarious position considering their products. An example of this might be a situation comedy where the characters go to a particular car manufacturer's dealership to buy a new car. Another illustrative embodiment identifies with the advertising data the car manufacturer's name and queues a prioritized commercial for the car manufacturer during the commercial break that was previously downloaded from the advertising data management system. This allows companies to prioritize advertising data for their products within programs and advertise for those products to selected end users or subscriber and at a time when the subscribers are most likely to retain their thoughts concerning those products.

With the growing average number of TVs per household, and the growing placement of products within programs, there is significant need for an intelligent model to deliver advertising. This solution allows advertisers to prioritize their commercials in a time slot that allows for maximum retention by TV viewers. It also allows service providers to profit by charging advertisers for each playback of their content. With two-way communication to the receiver, a service provider can determine how many times a specific commercial was played and charge the advertiser a fixed price/playback.

In another embodiment, a computer readable medium is disclosed containing computer executable instructions that when executed by a computer perform a method, the method including but not limited to receiving trick play command data at an end user device; receiving a plurality of advertising data at the end user device; correlating the plurality of advertising data with penetration data for an end user associated with the end user device; prioritizing the advertising data for the end user device based on the correlation; and presenting a portion of the advertising data on the end user device based on the prioritizing of the advertising data during execution of the trick play command data. In another embodiment of the medium the advertising data further includes but is not limited to advertising data keys.

In another embodiment of the medium the penetration data further includes but is not limited to at least one data set selected from the group consisting of advertising forwarding data and advertising discussion data for the end user. In another embodiment of the medium the penetration data further comprises penetration effectivity data based on impression quality factors for the advertising data forwarded by the end users. In another embodiment of the medium the correlating further comprises finding a penetration data category that matches one of the advertising data keys. In another embodiment of the medium the advertising data further comprises penetration category data for correlating with subscriber activity data for the end user.

In another illustrative embodiment, a system is disclosed, the system including but not limited to a processor in data communication with a computer readable medium; and a computer program embedded in the computer readable medium comprising computer executable instructions for execution by the processor, the computer program comprising instructions to receive trick play command data at an end user device, instructions to receive a plurality of advertising data at the end user device, instructions to correlate the plurality of advertising data with penetration data for an end user associated with the end user device, instructions to prioritize the advertising data for the end user device based on the correlation and instructions to present a portion of the advertising data on the end user device based on the prioritizing of the advertising data during execution of the trick play command data.

In another embodiment of the system the advertising data further includes but is not limited to advertising data keys. In another embodiment of the medium the penetration data further comprises at least one data set selected from the group consisting of advertising forwarding data and advertising discussion data for the end user. In another embodiment of the medium the penetration data further comprises penetration effectivity data based on impression quality factors for the advertising data forwarded by the end users. In another embodiment of the medium the instructions to correlate further comprise instructions to find a penetration data category that matches one of the advertising data keys. In another embodiment of the medium the penetration data further comprises penetration category data for correlating with subscriber activity data for the end user.

In another illustrative embodiment, a computer readable medium is disclosed, containing a data structure for containing data useful in sending advertising data the data structure including but not limited to a first field for containing data indicative of a trick play command data for execution at an end user device; and a second field for containing data indicative of prioritized advertising data based on advertising penetration data for an end user associated with the end user device for presentation at the end user device during execution of the trick play command data. In another embodiment of the medium, the data structure further includes but is not limited to a third field for containing data indicative of the advertising penetration data for the end user associated with the end user device. In another embodiment of the medium, the data structure further includes but is not limited to a fourth field for containing data indicative of advertising data key data for correlation with the advertising penetration data for prioritizing the advertising data.

In another embodiment of the medium, the data structure further includes but is not limited to a fifth field for containing data indicative of advertising forwarding data for advertising data forwarded by the end user at the end user device to other end user devices. In another embodiment of the medium, the data structure further includes but is not limited to a sixth field for containing data indicative of advertising discussion data for advertising data discussed by the end user at the end user device with other end users at other end user devices. In another embodiment of the medium, the data structure further includes but is not limited to a seventh field for containing data indicative of advertising penetration category data for the end user device.

Another illustrative embodiment provides of a content control application that provides two-way communication between a backend management system, a backend server management system to serve content to the receiver, and advertising data that is flagged with specific metadata, including but not limited to advertising data keys. During off-peak hours, the content control application communicates with the backend management system and imports available advertising data. This advertising data is then indexed on the content control application to allow for fast local content delivery. Once the content control application has indexed the available advertising data it is ready for that content to be played.

In a particular embodiment, a computer readable medium is disclosed containing computer executable instructions that when executed by a computer perform a method, the method including but not limited to monitoring video data for advertising data keys; correlating the advertising data keys with penetration data for an end user; and prioritizing advertising data for the end user based on the correlation between the advertising data keys and the penetration data for the end user. In another embodiment of the medium, in the method the penetration data further includes but is not limited to at least one data set selected from the group consisting of advertising forwarding data and advertising discussion data for the end user. In another embodiment of the medium, in the method the penetration data further includes but is not limited to penetration effectivity (PE) data based on impression quality factors for the advertising data forwarded by the end users. Penetration data is a measure of an extent to which a particular end user propagates advertising data to other end users. PE data is a measure of how effective the penetration by the end user has been. PE takes into account impression quality factors for a group of end users to whom a particular end user propagates advertising data. Thus, PE is a combination of penetration data and impression quality factors.

In another embodiment of the medium, in the method the correlating further includes but is not limited to finding a penetration data category that matches one of the advertising data keys. In another embodiment of the medium, in the method the closed captioning data further includes but is not limited to penetration category data for correlating with subscriber activity data for the end user.

In another embodiment, a system is disclosed including but not limited to a processor in data communication with a computer readable medium; and a computer program embedded in the computer readable medium including but not limited to computer executable instructions for execution by the processor, the computer program including but not limited to instructions to monitor video data for advertising data keys, instructions to correlate the advertising data keys with penetration data for an end user and instructions to prioritize advertising data for the end user based on the correlation. In another embodiment of the system, the penetration data further includes but is not limited to at least one data set selected from the group consisting of advertising forwarding data and advertising discussion data for the end user. In another embodiment of the system, the penetration data further includes but is not limited to penetration effectivity data based on impression quality factors for the advertising data forwarded by the end users. In another embodiment of the system, the instructions to correlate further comprise instructions to find a penetration data category that substantially matches one of the advertising data keys. In another embodiment of the system, the advertising data further includes but is not limited to penetration category data for correlating with subscriber activity data for the end user.

In another embodiment, a computer readable medium is disclosed, containing a data structure for containing data useful in prioritizing and presenting prioritized advertising data, the data structure including but not limited to a first field for containing data indicative of members of a community of end users in a data communication system; and a second field for containing data indicative of advertising penetration data for members of the community of end users. In another embodiment of the medium, the data structure further includes but is not limited to a third field for containing data indicative of advertising penetration effectivity data for the members of the community of end users. In another embodiment of the medium, the data structure further includes but is not limited to a fourth field for containing data indicative of advertising data key data for selecting advertising data from the advertising key data. In another embodiment of the medium, the data structure further includes but is not limited to a fifth field for containing data indicative of advertising forwarding data. In another embodiment of the medium, the data structure further includes but is not limited to a sixth field for containing data indicative of advertising discussion data. In another embodiment of the medium, the data structure further includes but is not limited to a seventh field for containing data indicative of advertising penetration category data.

In a particular illustrative embodiment, a system and method are disclosed for collecting penetration data for advertising data and estimating penetration effectivity (PE) indices for advertisement data, indicating not only which advertising data were forwarded and/or discussed by end users, but also impression quality factor indicating but not limited to how many devices upon which the advertising data were viewed and for how long/which portions of the advertising data were viewed, by which audiences and the effect the advertising data had on the recipient audiences. Accurate advertising ratings can be made available based on correlating program and advertising insertion data stored on video services servers (or embedded in content from video service providers) with subscriber activity logs which track customers' viewing behavior in some detail. In another embodiment, demographic data on end users is correlated with advertising ratings at the aggregate level.

In another particular embodiment, a computer readable medium is disclosed containing a computer program that when executed by a processor performs a method for estimating PE data for targeted advertising data for end users (also referred to herein as "users" or "subscribers") in a communication network, the computer program including but not limited to instructions to correlate impression quality factors categories data with a subscriber activity data profile for purchases and consumption related to an advertising category for the advertising data for a group of end users to whom a first end user forwards advertising data or discusses advertising data; and instructions to estimate from the correlation the PE in the advertising category for an advertising data. In another particular embodiment of the medium the instructions to estimate the PE further comprise instructions to add a reciprocal for a quality of impression for the advertising data to strength of response (SOR) for the advertising data, wherein the SOR indicates a degree of impact on the subscriber in an advertising category for the advertising data.

In another particular embodiment of the medium the impression quality factors categories data comprise combinations of impression quality factors data from at least two factors selected from the group consisting of subscriber device state data indicative of a degree of active advertising data viewing, subscriber type data indicative of a type of subscriber device receiving the advertising data, content character data indicative of a content character and subscriber type data indicative of a type of subscriber viewing the advertising data.

In another particular embodiment of the medium the impression quality categories data are formed by sorting impression quality factors data into the impression quality factors categories data, applying weights to the sorted impression quality factors categories data, and accumulating the weighted impression quality factors categories data into the impression quality factors categories data. In another particular embodiment of the medium the subscriber device type is selected from the group consisting of a personal computer, a mobile telephone, a television monitor, personal data assistant and web tablet. In another particular embodiment, of the method the subscriber type is selected from the group consisting of gender, age, income, geographic location, race and language. In another particular embodiment of the medium the subscriber device state is selected from the group consisting of speaker volume, display on duration, display off duration and multiple device usage, end user device preference, and current device.

In another particular embodiment, a system is disclosed for estimating PE for targeted advertising data in a community of users in a communication network, the system including but not limited to a processor in data communication with a computer readable medium; and a computer program embedded in the computer readable medium useful for performing a method for estimating PE for targeted advertising data in a communication network, the computer program comprising instructions for correlating impression quality factors categories data with a subscriber activity data profile for purchases and consumption related to an advertising category for the targeted advertising data and estimating from the correlation the PE in the advertising category for the targeted advertising data.

In another particular embodiment of the system, the computer program for estimating the PE further includes but is not limited to instructions to add a reciprocal for a quality of impression for the advertising data to a strength of response for the advertising data, wherein the strength of response indicates a degree of impact on the subscriber in an advertising category for the advertising data. In another particular embodiment of the system, the computer program further includes but is not limited to instructions for the estimating the strength of response by a difference between subscriber purchases in the advertising category before an impression for the advertising data and after the impression for the advertising data.

In another particular embodiment of the system the computer program further includes but is not limited to instructions to estimate the strength of response further include but are not limited to instructions for dividing the difference between subscriber purchases in the advertising category before an impression for the advertising data and after the impression for the advertising data, by a tendency in the advertising category, wherein the tendency is estimated as the sum of searches by the subscriber in the advertising category multiplied by a weighting factor M plus purchases by the subscriber in the advertising category multiplied by a weighting factor N. In another particular embodiment of the system the impression quality factors categories data comprise combinations of impression quality factors data from at least two factors selected from the group consisting of subscriber device state data indicative of a degree of active advertising data viewing, subscriber device type data indicative of a type of subscriber device receiving the advertising data, content character data indicative of a content character and subscriber type data indicative of a type of subscriber viewing the advertising data.

In another particular embodiment of the system the impression quality categories data are formed by sorting impression quality factors data into the impression quality factors categories data, applying weights to the sorted impression quality factors categories data, and accumulating the weighted impression quality factors categories data into the impression quality factors categories data. In another particular embodiment of the system the subscriber device type is selected from the group consisting of a personal computer, a mobile telephone, a television monitor, personal data assistant and web tablet. In another particular embodiment of the system the subscriber type is selected from the group consisting of gender, age, income, geographic location, race and language.

In another particular embodiment of the system, the subscriber device state is selected from the group consisting of speaker volume, display on duration, display off duration and multiple device usage, end user device preference, and current device. In another particular embodiment of the system the content character is selected from the group consisting of first run, rerun, special event, series episode and finale.

In another particular embodiment a data structure embedded in a computer readable medium is disclosed, the data structure comprising a first field for storing data indicative of PE for advertising data in an advertising category based on a correlation between impression quality factors data and subscriber activity data. In another particular embodiment, the data structure further includes but is not limited to a second field for storing data indicative of a quality of impression, Q wherein Q is based on the impression quality factors data. In another particular embodiment of the data structure further includes but is not limited to a third field for storing data indicative of strength of response (SOR) for containing data indicative of the SOR based on a difference between present consumption and past consumption in an advertising category for the advertising data divided by a sum of searches by the subscriber in the advertising category multiplied by a weighting factor M plus a consumption by the subscriber in the advertising category multiplied by a weighting factor N.

In another particular embodiment, a computer readable medium is disclosed containing computer program instructions that when executed by a computer perform a method for estimating PE for targeted advertising data in a communication network, the computer program comprising instructions to correlate impression quality factors categories data with a subscriber activity data profile for purchases and consumption related to an advertising category for the targeted advertising data; and instructions to estimate from the correlation the effectivity index in the advertising category for the targeted advertising data. In another particular embodiment, a client device is disclosed comprising a memory containing a computer program, the computer program further comprising instructions to collect impression quality factors categories data comprising combinations of impression quality factors data from at least two factors selected from the group consisting of subscriber device state data indicative of a degree of active advertising data viewing, subscriber device type data indicative of a type of subscriber device receiving the advertising data, content character data indicative of a content character and subscriber type data indicative of a type of subscriber viewing the advertising data.

In another particular embodiment, a system and method distinguish between real-time versus time-shifted viewing: Consumers who off-shift their viewing by using mechanisms such as DVR and TiVo™ may be motivated to do this partially by the opportunity it affords to fast-forward over advertisements during replay. In addition, some pre-recorded broadcasts containing embedded advertising data are never viewed (estimates range as high as one-third); or may be viewed so much later that advertisements have lost their value due to stale or expired offers that are no longer relevant. Another illustrative embodiment provides for tracking viewership on increasingly numerous alternative viewing devices, such as mobile MP3/video players, cell phones, and other personal mobile devices, as well as traditional in-home television sets.

In another particular embodiment, a system and method estimate an "engagement" or depth of experience—how "active" is "active viewing/listening" which is added into the impression quality factors and thus figures into penetration data and PE. The engagement, depth of experience and active viewing/listening are gauged by external indicators such as whether the sound during an advertisement on a subscriber device was tuned low, only the first few or last few seconds of a 30-second advertising spot were viewed, by which viewers in particular, and so on.

Another illustrative embodiment provides for monitoring of advertisement viewing by demographically-differentiated audiences. Monitoring can be performed for advertisements viewed during normal real-time broadcasting, for both national and local channels; advertisements viewed when replayed from any pre-recorded broadcasts; and advertisements included as headers or trailers in video-on-demand playouts or spliced into streaming media. Exactly which part(s) of the advertisements were viewed for how long is available with per-second or higher accuracy. Demographic differentiators can include but are not limited to viewership by community location and income level brackets, as well as estimates of the number of viewers by age, educational, professional, race, and gender categories, qualified by probability.

Another embodiment correlates records which indicate when and for how long advertisements occur in any media available for consumption by subscribers, with records which indicate exactly what the state of subscribers' devices is during such designated intervals while the media is being consumed. For example, suppose a 30-second advertisement occurs one minute after the broadcast of a TV series episode starts; the subscriber has programmed an STB or DVR to record the given episode; and the subscriber plays back the pre-recorded show the next day. Both the pre-recording and the playback can be dependent on a communication system provider, such as an Internet protocol television (IPTV) system, which through internal processing, are captured by IPTV logging. Substantially all media assets referred to herein as content available to subscribers are inventoried with advertisements, either as provided by the supplying vendor in metadata when uploaded, or as spliced in during broadcast at national or local acquisition servers or at the receiving subscriber device.

During playback on a subscriber device, records indicating subscriber behavior, including whether or not and for how long audio on a subscriber device has been muted and/or fast forwarded or other controls have been hit or initiated, are collected and stored in a subscriber acitivity data profile and impression quality factors data. Therefore, correlating the time during which the advertisement plays back with subscriber behavior indicates whether the advertisement was rendered or presented to the screen and/or speakers, which portions, and for how long to per-second or greater accuracy.

Another illustrative embodiment provides subscriber activity profile data and impression quality factors data. That is, these subscriber activity data profile data can identify when and for how long advertisements occur within available media, to identify subscriber behavior about media content consumption. Another particular embodiment monitors substantially all subscribers and substantially all subscriber devices and generates events and records of subscriber activity and impression quality factors data on a per-device and per-subscriber basis. There is substantially no limitation to any specific type of DVR, STB, or even to STB devices; subtantially all consumer devices, such as cell phones or personal data assistant (PDA's) capable of consuming IPTV triple-play or bundled services (IPTV, voice over internet protocol (VoIP) and Internet), are eligible for monitoring. In another particular embodiment, note that the mechanism introduces no distinctions between content such as national or local broadcast stations, streaming video or real-time broadcasting, or even between audio, video, and internet consumption; in that records distinguish advertisements from non-advertisements by temporal indicators at sub-second granularity.

In another particular embodiment, advertising data contain digital audio or video markers that are sensed during play back on a subscriber device that indicate advertising playback on a subscriber device at 100%, 75%, 50% and 25% duration. In particular, viewership of much more than "traditional" advertisements can be tracked using digital audio or video markers or temporal indicators or by correlating impression quality factors data with timing of advertising data presentation on a subscriber device. For example, VOD headers and trailers, or segments which feature "product placement" can be identified by markers or by a time in which the product placement, header or trailer appears in content on a subscriber device.

Internet surfing and interactive gaming are monitored, as well for subscriber activity data and impression quality factors data to estimate advertising data penetration. The IPTV system monitors subscriber data transactions, electronic program guides and metadata which distinguishes advertising data from content. With respect to internet usage, IP-level access records indicate which sites were displayed to the screen and/or played on the speaker. Monitoring can be narrowly targeted with respect to collection intervals, audience, and types of devices, as well as restricted to defined levels of aggregation. With respect to gaming or interactive media consumption, vendor-specific agreements can provide appropriate metadata and/or algorithms to estimate temporal markers for advertisements.

Another particular embodiment provides opportunities for correlation of advertisement viewership with patterns of consumer behavior. For example, tracking viewership of an advertised media event and estimating a degree of correlation that exists between having viewed its advertisement(s) and tuning into, and/or pre-recording, the event. Another embodiment estimates how a degree of correlation differs depending on whether the advertising data is presented in an episode in a "regular" series, a "special" episode in a regular series, special event (SUPER BOWL™, etc.) or a pay-per-view show. Another embodiment correlates consumers activating a new IPTV-capable device on their home network with having viewed advertisement(s) for the device.

Another embodiment tracks how many and which subscriber devices are in use referred to as (multiple device usage), including patterns for when and how each subscriber device is utilized over time, or when and how the subcriber devices may be used simultaneously or separately. At this level of granularity, estimates about how many viewers and the quality of the viewing that occurred for specific advertisements, and the demographics of each viewer, are derived and qualified by degree of probability. For example, during installation or troubleshooting, technicians may have recorded the exact placement of subscriber devices in the home, in relation to which household members were likely to use each subscriber device, as well as some personal characteristics of household members.

In particular, any available subscriber-specific information regarding device placement and IPTV VoIP and Internet consumption habits can be leveraged, as long as the final results of such calculations are limited to aggregate quantities not trackable to specific customers. Another embodiment provides for demographically rich data mining of advertisement viewing correlated with consumer media and product consumption behavior in a subscriber activity data profile, impression quality factors data, penetration data and PE.

Another embodiment records and provides details of which parts of advertisements were rendered to the screen and/or played in audio down to per-second granularity. Due to the availability of per-subscriber records independently maintained in the IPTV triple play system for purposes of billing and customer care, correlation of customer behavior with demographic factors are calculated, within well-defined categories or qualfied degrees of probability, at aggregate levels, while maintaining proper safeguards for privacy concerns of customers.

In another particular embodiment, subscriber impression quality factors data profile are calculated by correlating such subscriber related statistics and the subscriber activity data profile along with other subscriber data and information such as gender, age, income, languages spoken, areas of interest, etc. volunteered by a subscriber during an IPTV registration process. In another particular embodiment the subscriber activity data profile information contains data for which a subscriber has opted in for monitoring and use by an IPTV system (providing IPTV, VoIP and Internet) for the purposes of receiving targeted advertising data. Impression quality factors data can be estimated from data included in the impression quality factors data, including but not limited to device type, subscriber type, and device state based on the subscriber activity data profile.

Based on subscribers' interests, background, and subscriber profile data, one of the following targeted advertising data delivery system or method described herein or an equivalent thereof can be utilized to estimate PE for targeted advertising data provided to prioritized advertising data and television commercial delivery to end user devices and subscriber devices including but not limited to, IPTV television displays, portable subscriber data and messaging devices such as mobile or cell phones and website banners and pop up displays on a PC or Laptop. Thus, advertisements which have the highest PE for a particular end user are presented to the end user on an end user device such as a video presentation system during execution of trick play command data on the end user device.

Turning now to FIG. 1, the IPTV system 100 delivers video data including but not limited to video data content and advertising data to subscriber house holds 113 and associated end user devices (also referred to herein as subscriber devices) which may be inside or outside of the household. The video data further includes but is not limited to advertising data keys which are embedded in the video and advertising data. The advertising data keys include but are not limited to text, audio, imagery and video data added to the video data and advertising data for the video. The advertising data keys are generated from an aural recognition and pattern recognition analysis of the video data and advertising data. Advertisers select particular advertising data keys categories for detection of advertising opportunities in the video data. When a particular advertising data key category is detected in a video data stream, an advertising data key is placed in the video data or an associated data stream.

Television advertising data advertising data keys are inserted by the advertising server 138. In the IPTV system, IPTV channels are first broadcast in an internet protocol (IP) from a server at a super hub office (SHO) 101 to a regional or local IPTV video hub office (VHO) server 103, to an intermediate office (IO) server 107 and to a central office (CO) 103. The IPTV system 100 includes a hierarchically arranged network of servers wherein a particular embodiment the SHO transmits video and advertising data to a video hub office (VHO) 103 and the VHO transmits to an end server location close to a subscriber, such as a CO server 103 or IO 107. In another particular embodiment, each of the SHO, VHO, CO and IO are interconnected with an IPTV transport 139. The IPTV transport 139 may consist of high speed fiber optic cables interconnected with routers for transmission of internet protocol data. The IPTV servers also provide data communication for Internet and VoIP services to subscribers.

Actively viewed IPTV channels are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. Analysis of the video data for advertising data key insertion is performed by processor 123 at the VHO. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed.

In another particular embodiment, subscriber devices, also referred to herein as end user devices, are different stationary and mobile devices, including but not limited to, wire line phones 135, portable phones 133, lap top computers 118, personal computers (PC) 110 and STBs 102, 119 communicate with the communication system, i.e., IPTV system through residential gateway (RG) 164 and high speed communication lines such as IPTV transport 139. In another particular embodiment, DPI devices 166 inspect data VoIP, Internet data and IPTV video, commands and Meta data (multicast and unicast) between the subscriber devices and the IPTV system severs. DPI devices are used in analysis of the video data for insertion of the advertising data keys based on advertising data categories stored in the data base 125. In a particular embodiment advertising data forwarding and discussion of advertising data and user-to-user connectivity are detected by the DPI devices that monitor at data sent between end users. End user source and destination identifier data in data sent between end users are used to track user-to-user connectivity. Image, text and sound recognition functions are used to detect advertising data discussion and forwarding in addition to the DPI devices. Textual and aural key words and imagery found in the advertising data and messages sent and received by end user devices are inspected by the DPI devices 166 and image recognition functions in the processors 123 in the communication system servers and end user devices are used as indicators found in messages sent between users to estimate penetration of advertising data from discussion and forwarding of the advertising data between users, also referred to herein as end user devices. Impression quality factions for end users identified in penetration data are used to estimate PE.

In another illustrative embodiment impression quality factors data are monitored and collected whether or not the subscriber's devices are in the household 113 or mobile outside of the household such as cellular phones 134. When outside of the household, subscriber mobile device data is monitored by communication network (e.g. IPTV) servers and DPI devices which associate the impression quality factors data with particular subscribers. In another particular embodiment, impression quality factors data including subscriber activity data such as communication transactions are inspected by DPI devices located in a communication system, e.g., IPTV system servers. These communication system servers route the impression quality factors data to a VHO or CO in which the impression quality factors data for a subscriber are stored for processing.

In another particular embodiment, the end user devices or subscriber devices include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP data, Internet data and IPTV video, commands and Meta data between the subscriber devices and between subscriber devices and the IPTV system severs.

In another illustrative embodiment impression quality factors data are monitored and collected whether or not the subscriber devices are in the household 113 or the devices are mobile devices 134 outside of the household. When outside of the household, subscriber mobile device data is monitored by communication system (e.g., IPTV) servers which associate the impression quality factors data with each particular subscriber's device. In another particular embodiment, impression quality factors data including subscriber activity data such as communication transactions are inspected by DPI devices located in a communication system, e.g., IPTV system servers. These communication system servers route the impression quality factors data to a VHO in which the impression quality factors data for a subscriber are stored for processing in determining advertising data penetration and prioritization of the advertising data for end users and for highly connected users (HCUs) based on end users and HCUs contributions to the penetration of the advertising data.

As shown in FIG. 1 advertising sub groups 112 (comprising a group of subscriber house holds 113) receive multicast advertising data and advertising data keys in video data stream from 10 server 107 via CO 103 and DSLAM 109 at STB 102. In another particular embodiment, each STB is configured to perform DVR functionality using memory, processor and data base on board the STB. Individual households 113 receive advertising data at set top box 102 or one of the other subscriber devices. More than one STB (see STB1 102 and STB2 119) can be located in an individual household 113 and each individual STB can receive a separate multicast or unicast advertising stream on IPTV transport 139 through DSLAM 109. In another particular illustrative embodiment separate and unique advertising data are displayed at each set top box (STB) 102, 119 tailored to target the particular subscriber watching television at that particular STB. Each STB 102,119 has an associated remote control (RC) 116 and video display 117. The subscriber via the RC selects channels for a video data viewing selection (video programs, games, movies, video on demand), initiates trick play commands data to the STB/DVR and places orders for products and services over the IPTV system 100. Advertising data keys are generated and inserted at the VHO and used to select advertising data that is then sent to end user devices. In another embodiment, advertising data keys are generated at the end user devices by processors at the end user devices. Advertising data at the end user devices can then be selected for display by the end user devices based on processing of the advertising data keys described herein.

FIG. 1 depicts an illustrative communication system, including but not limited to a television advertising insertion system wherein television advertising data can be inserted at an IPTV (SHO, VHO, CO) server or at the end user client subscriber device, for example, an STB, mobile phone, web browser or personal computer. Advertising data can be inserted into an IPTV video stream via advertising insertion device 129 at the IPTV VHO server 105 or at one of the STBs 102, 109. The IPTV servers include an advertising server 138 and an advertising database 139. The advertising data is selected by advertising selection element 129 from the advertising database 125 based on subscriber profile data and delivered by the VHO advertising server 138 to the IPTV VHO server 115. An SHO 101 distributes video, advertising and subscriber profile data to a regional VHO 103 which distributes data to local COs 105 which distribute data via IO 107 to a digital subscriber access line aggregator multiplexer (DSLAM) access node to subscriber devices such as STBs 102, 119, PC 110 wire line phone 135, mobile phone 133 etc. Advertising data is also selected based on the community profile for users in the community and sent to a mobile phone or computer associated with the subscriber or end user devices in the community. The community subscriber profile is built based on a community of subscriber's IPTV, Internet and VoIP activity. Compensation system 121 determines compensation for HCUs based on advertising data penetration.

Figure 2:
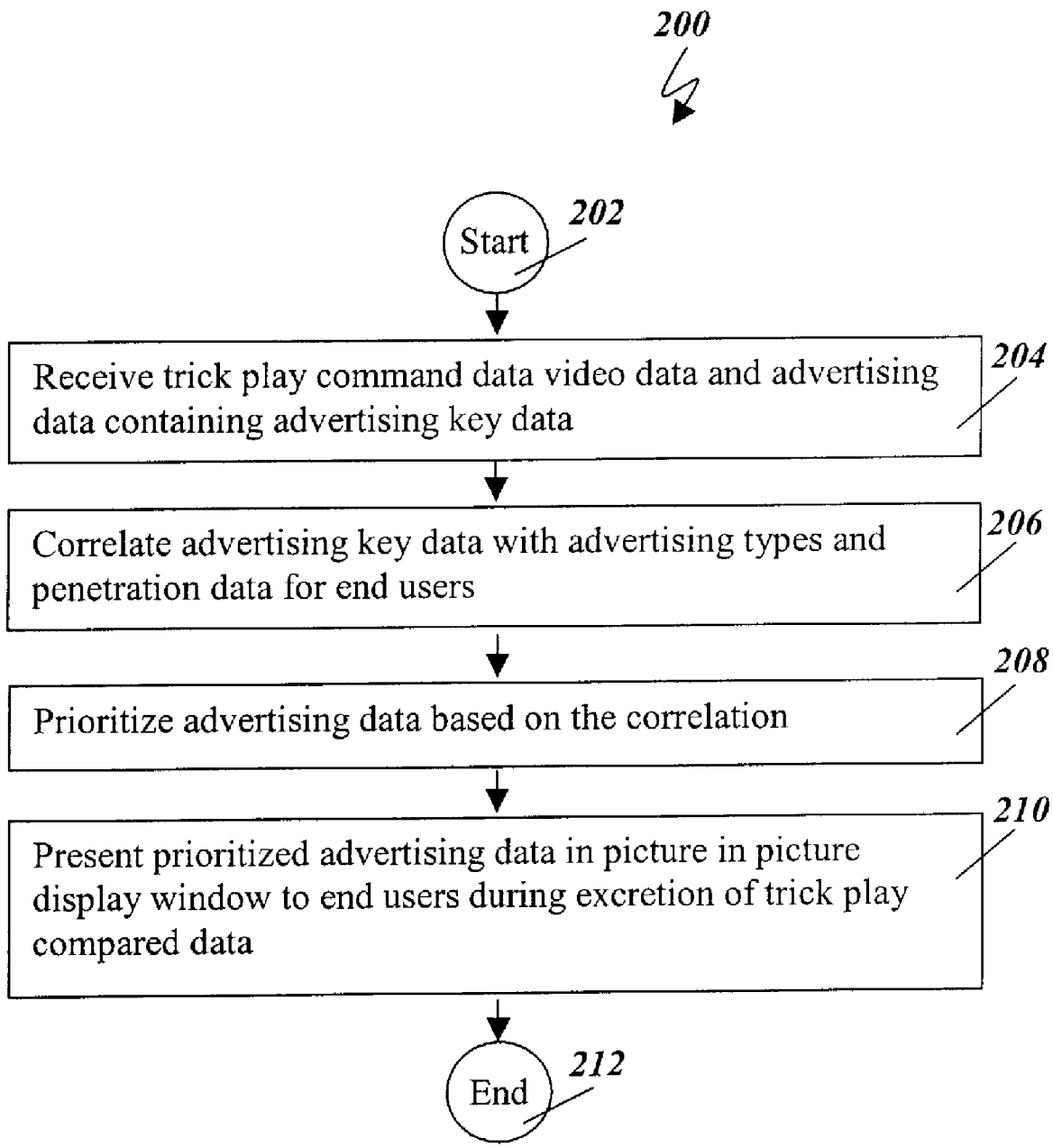
FIG. 2 depicts a flow chart for functions performed in another illustrative embodiment for delivering priority advertising data to subscribers during playback of video data on a video data presentation device in a communication system, such as an IPTV system.

Turning now to FIG. 2, FIG. 2 depicts a flow chart for functions performed in another illustrative embodiment for delivering advertising data to subscribers in a communication system, such as an IPTV system. As shown in FIG. 2 in block 202 an illustrative embodiment receives data, for example, advertising data containing advertising data keys associated with video data. In block 204 a particular illustrative embodiment correlates the advertising data keys with advertising types, penetration data, PE and penetration categories. Advertising data associated with the advertising data keys are prioritized based on the correlation of the advertising data keys with advertising types, penetration data, PE and penetration categories. In block 206, a particular illustrative embodiment selects the highest advertising data to present to the end user during execution of trick play command data based on the correlation. In block 208 a particular illustrative embodiment presents the selected prioritized advertising data to the end user during execution of the trick play command data.

Figure 3:
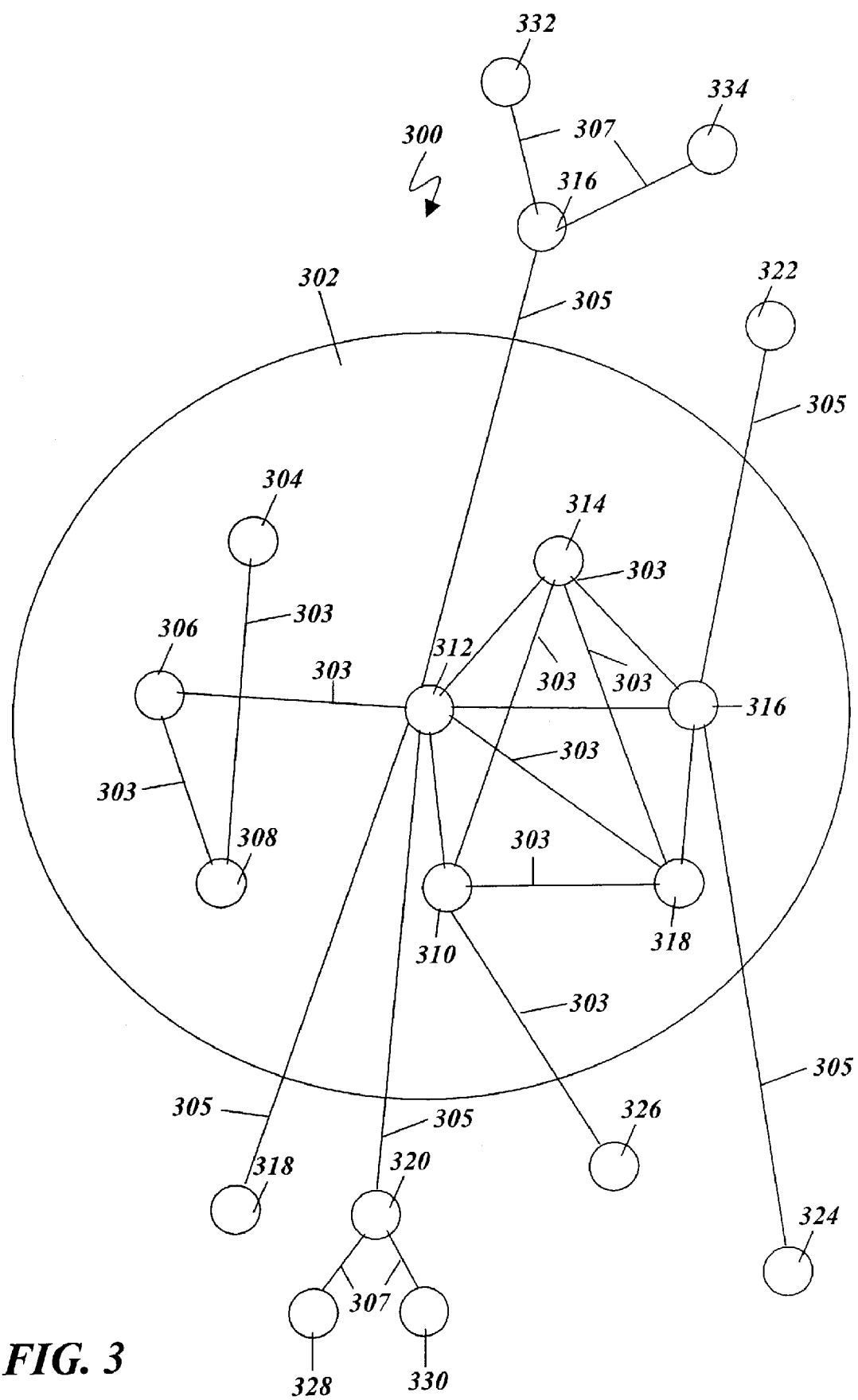
FIG. 3 depicts end user connectivity relationships between end user devices associated with end users in an illustrative embodiment.

Turning now to FIG. 3, in an illustrative embodiment a community of end users 302 includes a number of subscribers or end users associated with subscriber/end user devices 304, 306, 308, 310, 312, 314, 316 and 318. User-to-user connectivity is measured by number, frequency, duration of and data volume of interactions 303 between end user devices associated with end users or subscribers 304, 306, 308, 310, 312, 314, 316, and 318. As shown in FIG. 3, end users 310, 312, 314, 316, and 318 have substantially more user-to-user connectivity than end users 304, 306 and 308. In a particular embodiment, end users 310, 312, 314, 316, and 318 are classified as highly connected users (HCUs). Each HCU has a zone of influence (ZOI) defined by connectivity between the HCU and end users outside of the community 302. The ZOI for HCU 312 includes end users 316, 318 and 320. HCU to ZOI connectivity is measured by the number, frequency, duration and data volume of interactions 305 between the HCU and the end users 316, 318 and 320 in the ZOI. HCU 312 connectivity outside of the ZOI is measured by the number, frequency, duration and data volume of interactions 307 between the HCU 312 ZOI end users 316, 318 and 320 and end users 328, 330, 332 and 334. Interactions 303, 305 and 307 are monitored to determine advertising data forwarding, advertising data discussion and advertising data penetration within the ZOI and beyond the ZOI.

Figure 4:
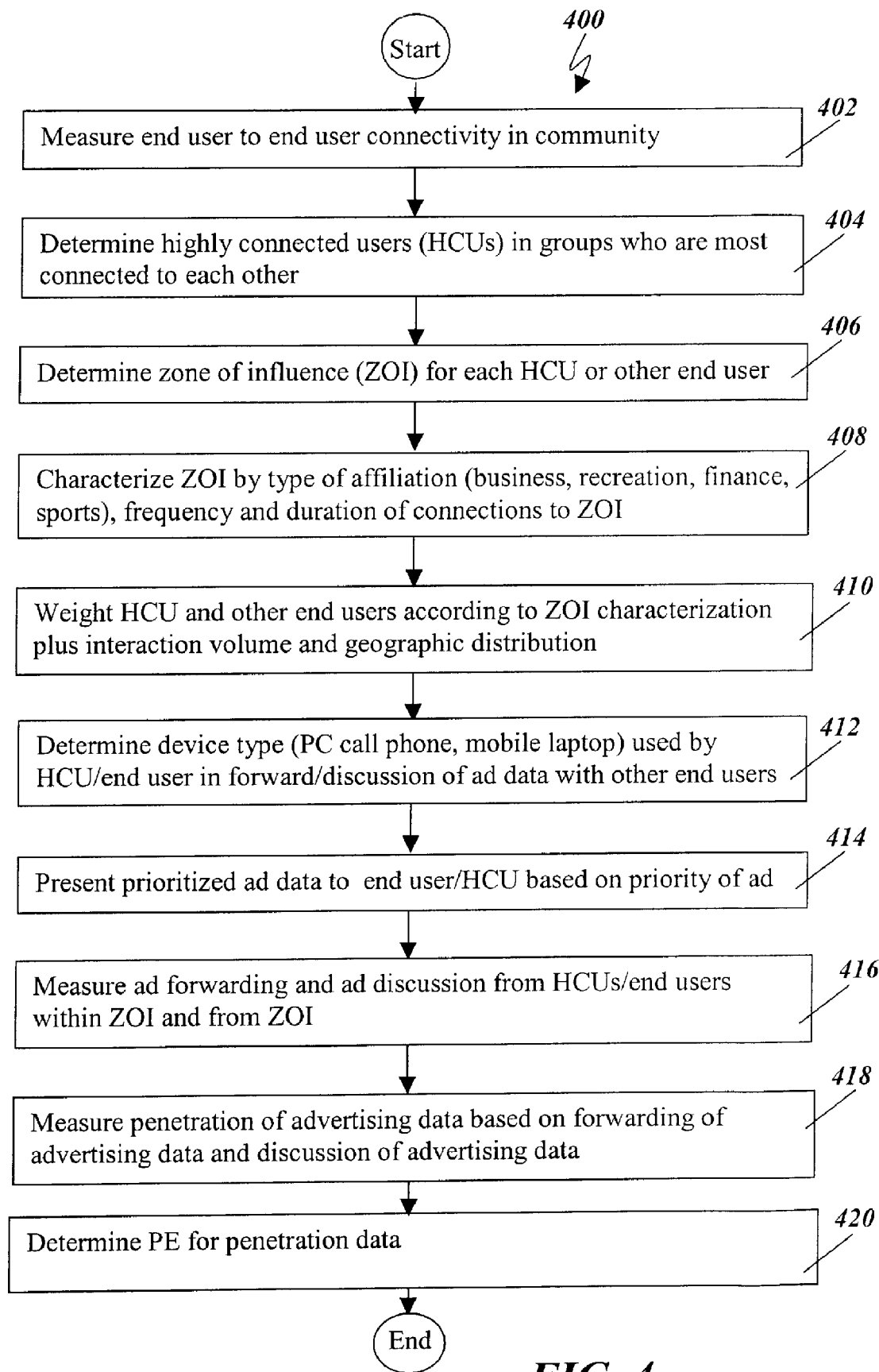
FIG. 4 depicts a flow chart for functions performed in another illustrative embodiment for monitoring data sent and received by various subscriber or end user devices associated with end users or subscribers in a communication system, such as an IPTV system.

Turning now to FIG. 4, in a particular embodiment, a flow chart 400 of functions are preformed. The order of execution of functions and the selected functions to be executed is different in different embodiments and is not limited to the order of execution and functions shown in FIG. 4. As shown in FIG. 4, in block 402 an illustrative embodiment measures user-to-user connectivity between end users within the community of users in a communication system. In block 404 an illustrative embodiment determines HCUs as users who are most connected to others end users in the community. In block 406 an illustrative embodiment determines a ZOI for each HCU. In block 408 an illustrative embodiment characterizes each HCU ZOI by type of affiliation (i.e., type of data exchange and discussion type, i.e. sports, news, fashion, etc.) between end users in the HCU ZOI. In block 410 an illustrative embodiment assigns weights to each HCU according to the HCU ZOI characterization for the HCU. The HCU ZOI characterization includes but is not limited to type of affiliation, frequency and duration of connections to ZOI and beyond the ZOI.

In block 412, an illustrative embodiment determines a device type for an HCU and end users in the community and ZOI used to connect to each other for advertising data forwarding and advertising data discussion. In block 414 an illustrative embodiment a VHO sends advertising data to an uppermost top tier HCU in the community based on ZOI characterization. In block 416, an illustrative embodiment measures interactions including but not limited to advertising data forwarding and advertising data discussion in each HCU in the community of end users and between the HCU and the end users in the HCU ZOI. In block 418 an illustrative embodiment measures or determines penetration of advertising data from each HCU and the community in which the HCUs reside based on forwarding of advertising data and discussion of advertising data from the HCU to the community and to the end users in the ZOI. In block 420 an illustrative embodiment determines PE for the penetration data. In a particular embodiment the community is a group of end users associated by similar demographic, geographic or interests.

Figure 5:
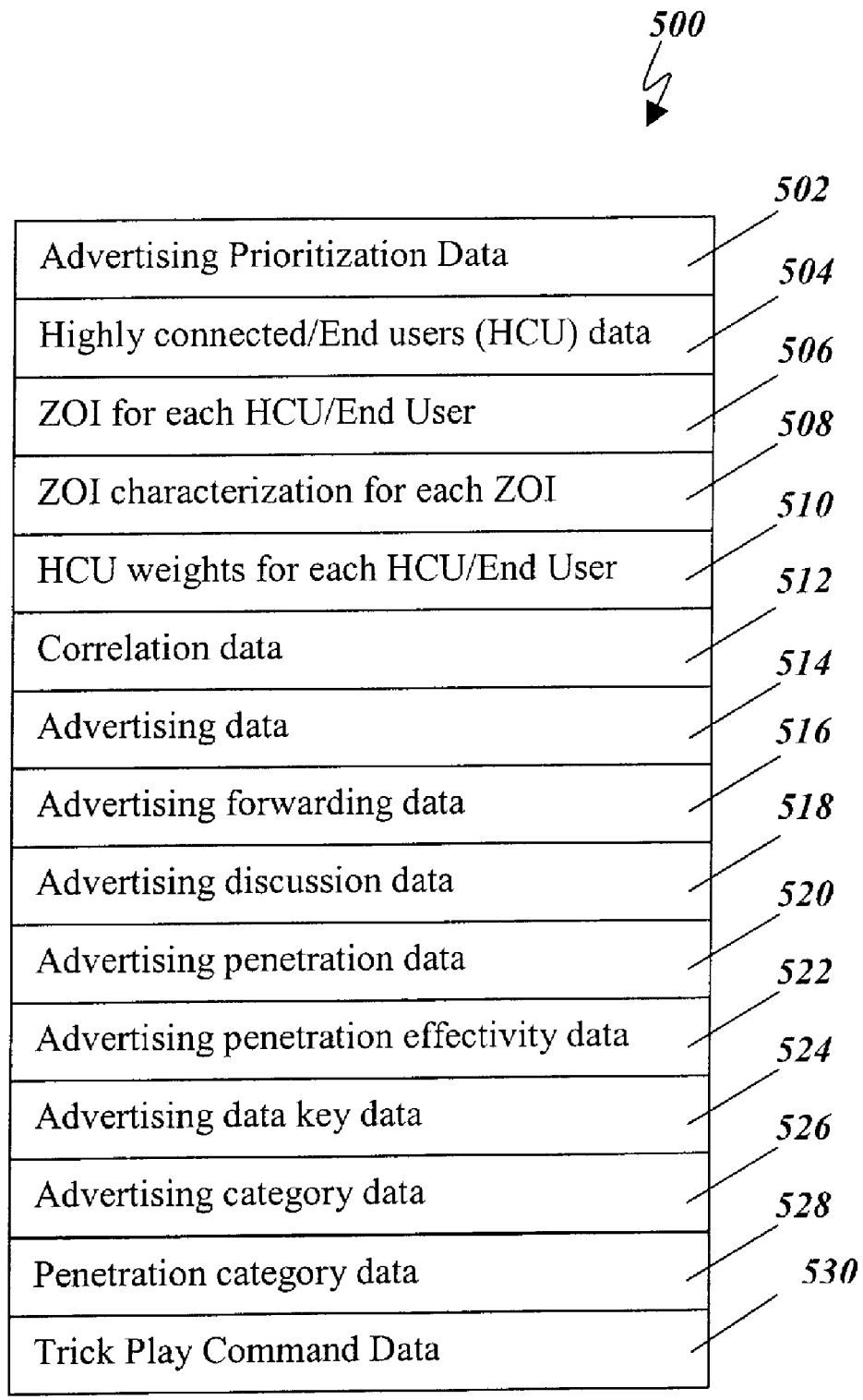
FIG. 5 depicts a data structure embedded in a computer readable medium that is used by a processor and method for delivering advertising data.

Turning now to FIG. 5, in a particular illustrative embodiment a data structure embedded in a computer readable medium is disclosed. The data structure includes but is not limited to a first field 502 for containing priority ranking data indicative of prioritization data for presentation of prioritized advertising data to an end user. In another particular embodiment, the data structure further includes a second field 504 for containing data indicative of HCUs in the community of end users. In a particular embodiment, the data structure further includes a third field 506 for containing data indicative of a ZOI of end users in an HCU ZOI for each HCU identified in field 504. In another particular embodiment, the data structure further includes a fourth field 508 for containing data indicative of ZOI characterization for each HCU ZOI. In a particular embodiment, the data structure further includes a fifth field 510 for containing data indicative of HCU weights for each HCU.

In a particular embodiment, the data structure further includes a sixth field 512 for containing data indicative of containing correlation data indicating a correlation between advertising characterization data and the HCU weights. In a particular embodiment, the data structure further includes a seventh field 514 for containing data indicative of adverting data sent to the HCUs and monitored for forwarding, discussion, penetration and PE.

In a particular embodiment, the data structure further includes an eighth field 516 for containing data indicative of advertising data forwarding from the HCU and from the ZOI. In a particular embodiment, the data structure further includes a ninth field 518 for containing data indicative of advertising discussion between the HCU and members of the community and between the community and the HCU ZOI which started from the HCU. In a particular embodiment, sender identifiers in the data transmissions are used to identify, in an IPTV server or DPI device, the source of a forwarded advertising data and discussion message. In a particular embodiment, the data structure further includes a tenth field 520 for containing data indicative of advertising penetration data for the identified advertising data 514. In a particular embodiment, the data structure further includes an eleventh field 522 for containing data indicative of advertising penetration effectivity data. In a particular embodiment, the data structure further includes a twelfth field 524 for containing data indicative of advertising key data. In a particular embodiment, the data structure further includes a twelfth field 526 for containing data indicative of advertising category data. In a particular embodiment, the data structure further includes a thirteenth field 528 for containing data indicative of advertising penetration category data. In another particular embodiment, the data structure further includes a fourteenth field 530 for containing data indicative of trick play command data to be executed on an end user device during presentation of the prioritized advertising data.

Figure 6:
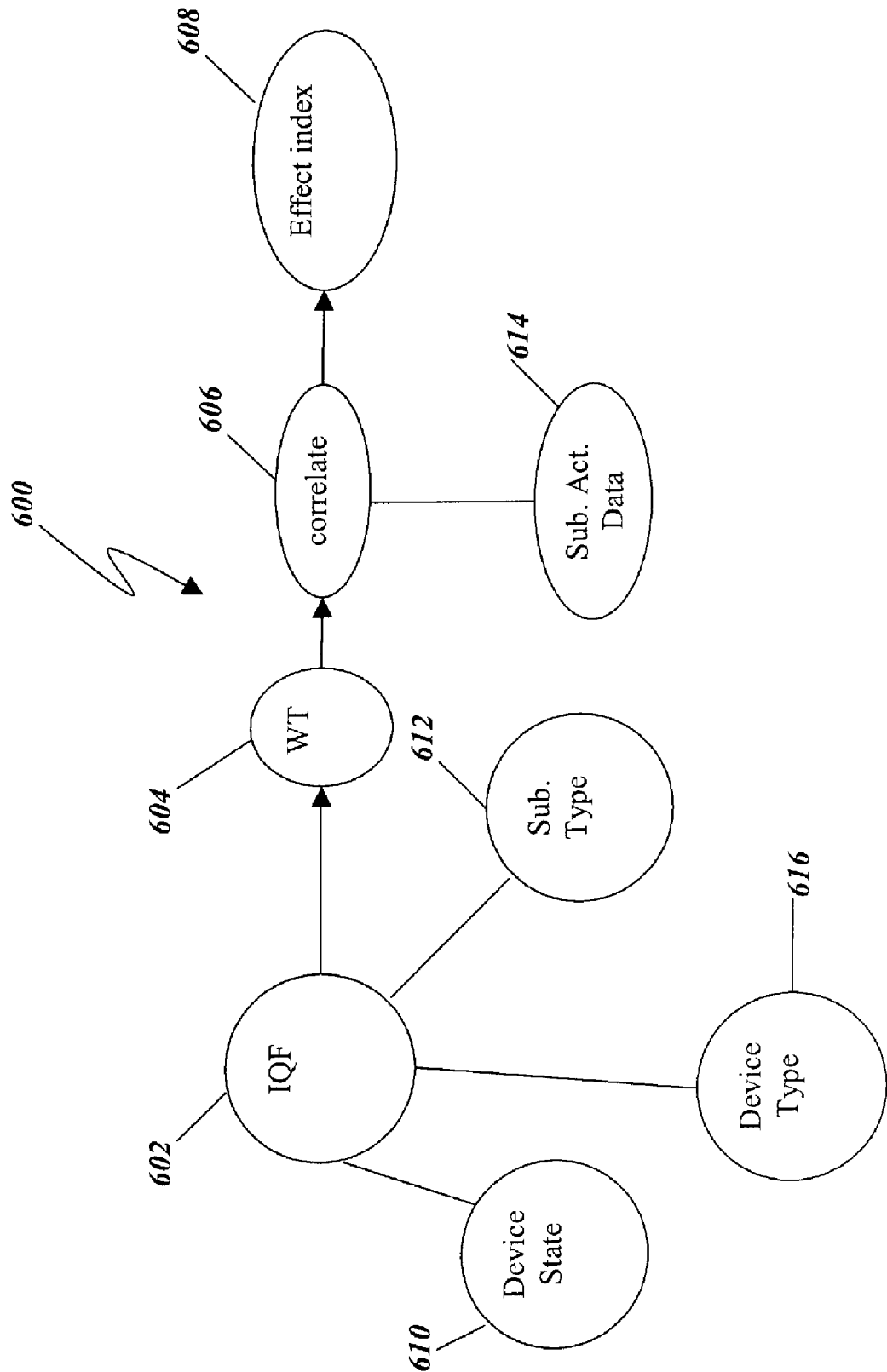
FIG. 6 depicts a data flow diagram for functions performed in another illustrative embodiment for monitoring data sent and received by various subscriber devices associated with subscribers in a communication system, such as an IPTV system.

FIG. 6 depicts a data flow diagram for another illustrative embodiment of a system for sending advertising data and monitoring data sent and received by various subscriber devices associated with subscribers in an IPTV system 100 for monitoring advertising impression quality factors data, advertising data forwarding and advertising data discussion for the subscriber devices. In a particular, illustrative embodiment, the impression quality factors data 602 are accumulated at a subscriber device or through database entries available in the IPTV network subscriber devices report their impression quality factors data to the IPTV system. As shown in FIG. 6 the device state 610, device type 616 and subscriber type 612 are accumulated as impression quality factors data 602. These impression factors quality data, including but not limited to advertising data discussion and advertising data forwarding, are categorized into impression quality factors data categories, and weighted at 604 using weights assigned by the IPTV system for particular impression factor quality data categories. The weighted HCUs, impression quality factors and categories data are correlated with the subscriber activity data 614. The correlation of the weighted, impression quality factors categories data and the subscriber activity data are utilized to estimate the penetration data and penetration effectivity data 608 for end users for the advertising data.

Figure 7:
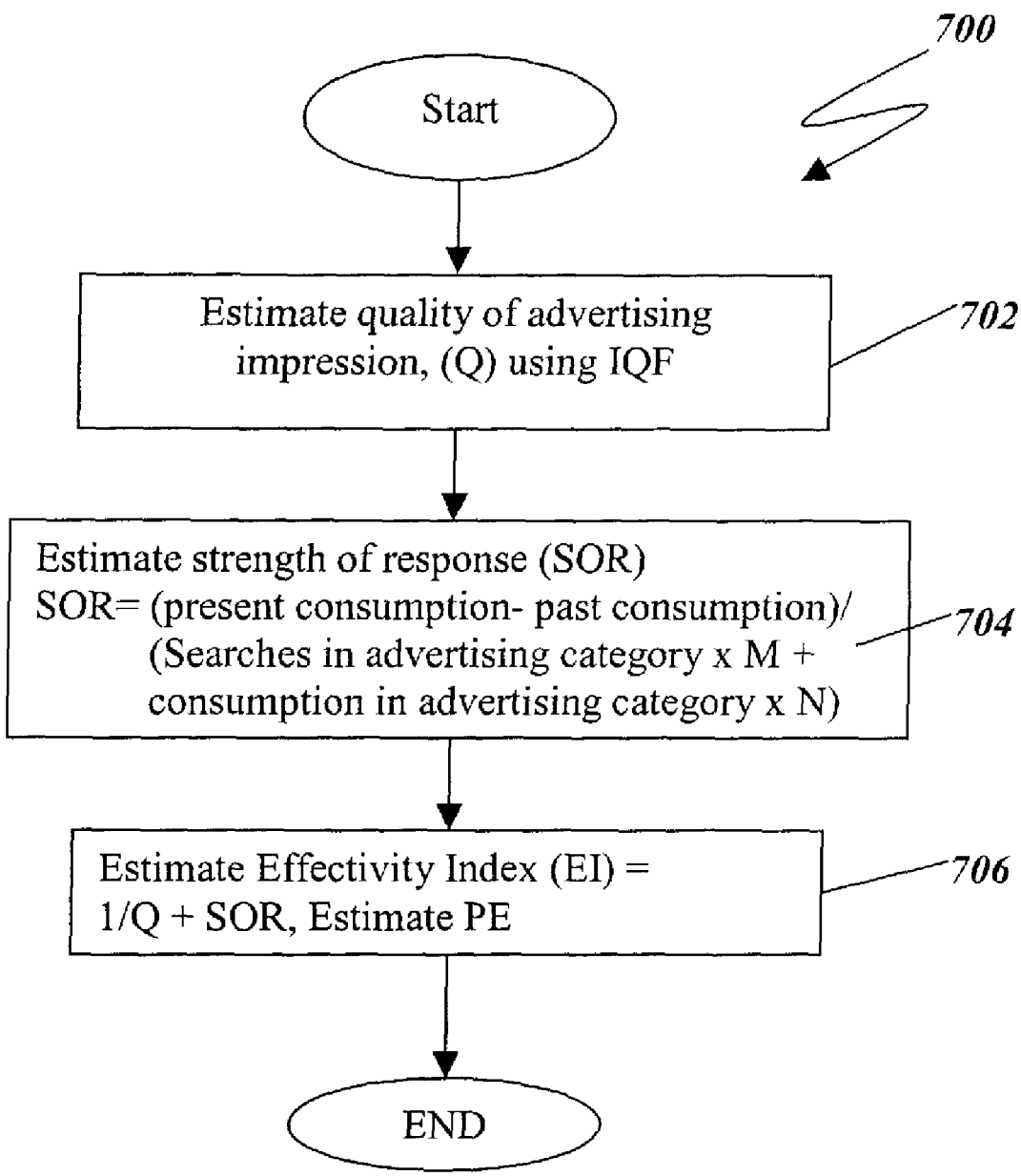
FIG. 7 depicts a flow chart for functions performed in another illustrative embodiment for delivering prioritized advertising data based on monitoring of data sent and received by various subscriber devices associated with subscribers in a communication system, such as an IPTV system.

Turning now to FIG. 7, in an illustrative embodiment a function 700 is performed to correlate the impression quality factors category data with the subscriber activity data. The subscriber activity data includes data from a subscriber activity data profile which chronicles purchases and media consumption for a subscriber. Purchases can include but are not limited to purchases over the Internet via eCommerce as well as purchases of media content such as music, movies, books and video on demand. Media consumption can include but is not limited to programs watched, web sites visited, games played, searches performed and music downloaded. Subscriber activity data is collected at the subscriber device and at the IPTV system though monitoring data sent and received to and from the subscriber devices. Subscriber activity data includes but is not limited to data indicating advertising data forwarding, discussion and user-to-user connectivity for a subscriber. As shown at block 702, a particular embodiment estimates the quality of advertising impression, Q using the impression quality factors categories data. The impression quality factors data are sorted into categories and weighted as discussed below.

At block 704 a particular embodiment estimates the strength of response (SOR). The SOR is a measure of the impact or degree of influence that a particular advertising data has on a subscriber in a particular advertising category, based on changes in the subscriber's purchasing and/or consumption after receiving the advertising data directly, forwarded from another user or discussed with another user. The rate of change over time for an SOR in a particular advertising category is a trend for the particular advertising category. The advertising category may be associated with or the same as one of the impression quality factors categories. The subscriber's purchasing and/or consumption trend is estimated from changes in the subscriber's subscriber activity data profile in a particular advertising category. The subscriber activity data profile captures purchases and/or consumption by a subscriber by tracking transactions and selections made on the IPTV triple play network and sorting the transactions into advertising, product and interest categories. These purchases and consumption may include but are not limited to IPTV, VoIP and Internet purchases and consumption. In another embodiment, the SOR equals a quantity for present purchases and/or consumption in a particular advertising category associated with the advertising data, minus a quantity for past purchases and/or consumption in a particular advertising category associated with the advertising data; divided by an indication of the subscribers interest in the advertising category as indicated by a number of searches in the particular advertising data category times a weighting factor, M plus purchases and/or consumption in the particular advertising data category multiplied by waiting factor, N.

The weighting factors M and N are programmable so that searches in a particular advertising category can be weighted more or less than purchases and/or consumption in a particular advertising category. Advertising categories can include but are not limited to sports, fashion, art, literature, action movies, mysteries, food, travel and health. At block 706 a particular embodiment estimates the effectivity index, (EI) as equal to one divided by the estimate of the quality of advertising impression, Q added to the strength of response (SOR). In another particular illustrated embodiment, a subscriber household 113 sends impression quality factors data from an RG or STB in a subscriber household or from a mobile device to an access node such as a DSLAM 109. When sent to the VHO, the identity of the subscriber is associated with the impression quality factors data. The identity of the subscriber can be stripped off of the data as it is aggregated in the IPTV system. The access node 109 sends data to a VHO through a CO.

In another particular illustrative embodiment service applications are provided by a communication network such as an IPTV system. The service applications include but are not limited to an IPTV system providing IPTV, Internet and VoIP (herein referred to as an IPTV system). Advertisements are inserted by the IPTV system into SMS messages, video and HTML data the IPTV system by advertising server 138. The service VHO communicates with the subscriber household 113 via the IPTV system servers and collects the subscriber data comprising the impression quality factors data from the household, the access node, aggregation network, service network and service applications.

In another particular illustrative embodiment access node control protocol (ANCP) is used to communicate between the service CO or IO in the communication network and an access node 109. In another particular illustrative embodiment access node 109 is a DSLAM. In another illustrative embodiment, the aggregation network or central office 109 communicates with the SHO and VHO. In another particular illustrative embodiment, the CO communicates with the service application or IPTV system over an IPTV system communication path.

In another particular illustrative embodiment, the VHO receives impression quality factors data, including but not limited to device state data indicative of a degree of active advertising data viewing, device type data indicative of a type of advertising device, receiving the advertising data, and subscriber type data indicative of a type of subscriber viewing the advertising data. The impression quality factors data further include but are not limited to channel viewer ship data including but not limited to multicast join data indicating what IPTV program a subscriber is watching, subscriber device state data and subscriber activity data collected from the access node. The VHO receives the impression quality factors data, advertising data forwarding data, advertising data discussion data, penetration data and sends the data to the data base 125. The data base 125 collects impression quality factors data, including but not limited to advertising data forwarding and advertising data discussion, applies weights and curves 130, correlates the weighted and accumulated impression quality factors categories data 128 with advertising quality criteria data to generate the qualified impression quality count 136. HCUs are rated based on their contribution to penetration of the advertising data.

As shown in FIG. 1, in a particular embodiment, impression quality factors data and impression quality factors categories data 128, impression quality factor categories weights, subscriber activity data profiles and curves 130 and penetration data 129 are stored at the VHO data base. The impression quality factors categories data and subscriber activity data are correlated 132 at the CO level and above. A number of customers viewing the commercial or advertising data vary at each time in a time interval.

Figure 8:
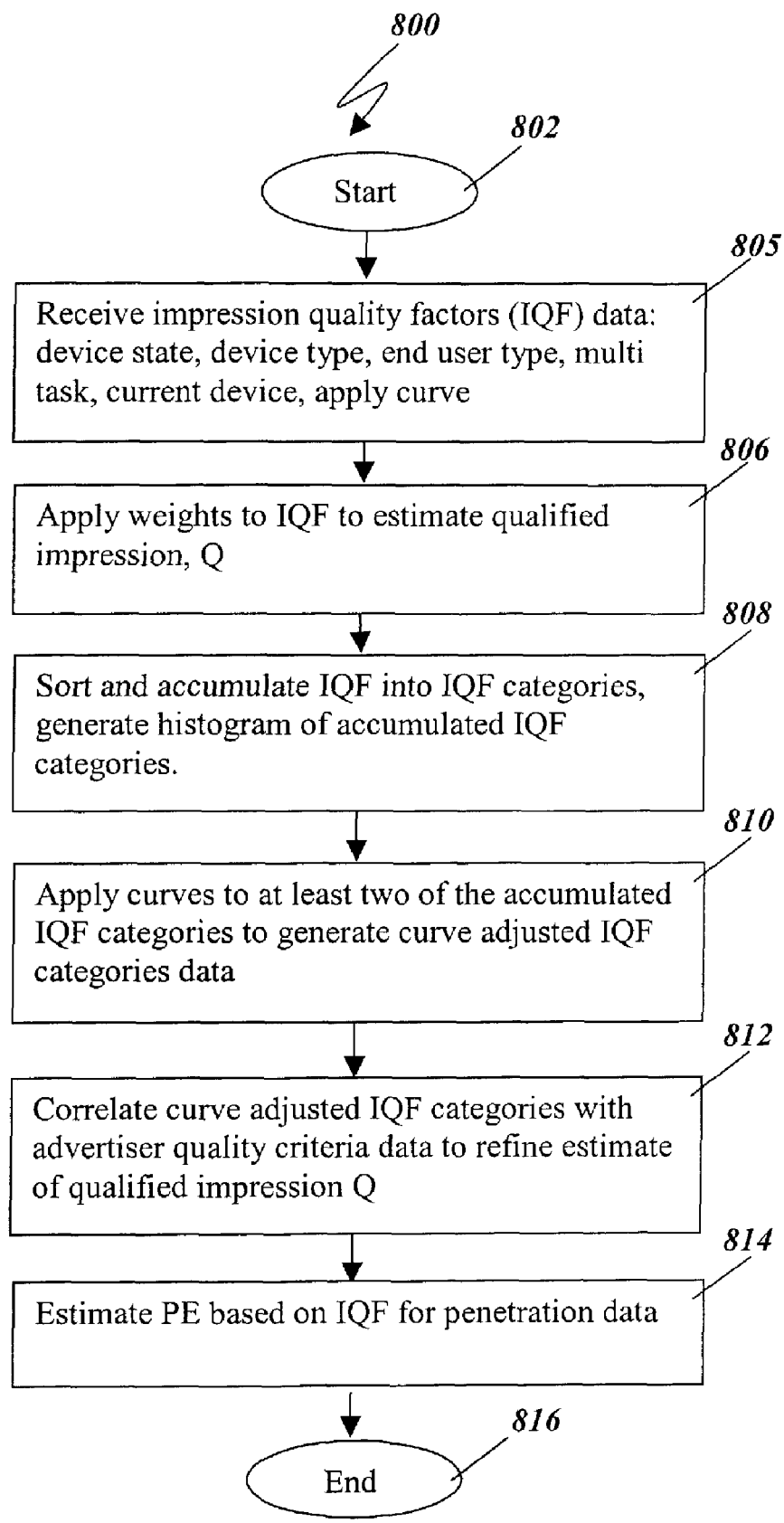
FIG. 8 depicts a flow chart for functions performed in another illustrative embodiment for presenting prioritized advertising data in a PIP window based on monitoring data sent and received by various subscriber devices associated with subscribers in a communication system, such as an IPTV system.

Turning now to FIG. 8 a flowchart 800 is illustrated for another particular embodiment in which functions are performed. As shown in block 802 in another particular illustrative embodiment a function starts and proceeds to block 804, where a server receives impression quality factors data from subscriber devices comprising subscriber device state, device type, subscriber type, multiple device usage, current device state, and application curve. In another particular illustrative embodiment at block 806, the impression quality factors data are sorted into impression quality factors categories data and weights are applied to the impression quality factors category data to estimate qualified impression quality, Q. At block 808, another embodiment accumulates weighted impression quality factors, and generates a histogram of the accumulated impression quality factor categories data. The impression quality factors are applied to the transactions between end users including but not limited to advertising data discussion and advertising data forwarding.

In another particular illustrative embodiment, an advertiser assigns weights from one through ten (1-10) to impression quality factor data categories. Thus when advertising data is discussed or forwarded to a user, impression quality factors data are calculated for the recipient of the advertising data forwarded or discussion data pertaining to the advertising data. The impression quality factor data categories include but are not limited to impressions for particular subscriber device types for particular subscriber types in particular advertising categories. Advertising categories are assigned by the IPTV system. The advertising categories in another particular embodiment include but are not limited to luxury cars, travel, health, education and entertainment.

For example, impressions are qualified for a forwarded or discussed advertising data for a particular advertising category, luxury cars for a particular subscriber type, women. In this example, a particular luxury car slanted toward women are assigned weights as follows: For advertisements forwarded or discussed and viewed on television, a weight of 10 is assigned for women age 35-55, a weight of 7 for women age 18-35, a weight of 8 for men 35-55, a weight of 5 for men 18-35. For advertisements viewed on mobile telephones, a weight of 8 for women age 35-55, a weight of 5 for women age 18-35, a weight of 6 for men age 35-55, a weight of 4 for men age 18-35. For online commercials forwarded or discussed and viewed a weight of 6 for women age 35-55, a weight of 3 for women age 18-35, a weight of 4 for men age 35-55, a weight of 2 for men age 18-35.

Geographic weights are also assigned by advertisers based on desired geographic coverage for a ZOI and penetration desired for particular advertising data. A histogram of viewers sorted by impression quality factor categories is generated showing how many viewers in each impression quality factor category viewed a particular advertisement. Different weights are assigned for advertising data forwarded and advertising data discussed, depending on the advertiser's set parameters for calculating advertising data penetration. In a particular embodiment, a weight of 5 out of 10 is assigned for forwarding advertising data, a weight of 7 assigned for replaying the forwarded advertising data and a weight of 3 assigned for discussing the advertising data.

An additional weight point can be assigned (i.e., given a weight of 9 instead of 8) to subscribers who receive and view forwarded advertising data on a subscriber device that is received and viewed on their preferred subscriber device as indicated by a subscriber device preference. A subscriber device preference is indicated by a subscriber profile showing that prior reception of advertisements on a particular subscriber device type are viewed and not skipped. For example, if a subscriber receives an advertisement on a television for a particular product but only views 10 seconds of a 30 second advertisement, but views the entire advertisement of the same advertisement on a mobile phone, then the subscriber's preferred subscriber device is a mobile phone and advertisements viewed on the mobile phone are given extra weight. In this case the subscriber device preference is the mobile phone. In another particular embodiment, a subscriber device preference is indicated by a subscriber selection at registration with a communication network.

Values can also be assigned for duration or how much of an advertisement a particular subscriber watched. If a subscriber only saw the first 10 seconds of a 30 second advertisement, the advertisement viewing receives a only one sixth of its assigned weight and may be deemed as inappropriate for the demographic and device type for that particular viewer type, for example, males 18-35 on a mobile phone. If the same advertisement is watched for the last 20 seconds of the advertisement, the advertisement viewing receives three fourths of its assigned weight and deemed appropriate for the demographic and device type for that particular viewer type, for example, males 18-35 on a mobile phone. The weighted impression quality factors are adjusted for duration and accumulated for additional processing.

At block 810 a particular illustrative embodiment applies curves to at least two of the accumulated compression quality factor categories data to generate curve-adjusted impression quality factors categories data. In a particular embodiment, different curves are applied to different impression quality factor categories data to generate curve-adjusted impression quality factor categories data. For example, continuing with the luxury car example from above, different curves are applied to different accumulated impression quality factors categories data. An S curve in applied data for men ages 18-35 and 35-55, a linear curve to data for women age 35-55 and an exponential curve to data for women age 35-55. In another particular illustrative embodiment, at block 812 a particular illustrative embodiment correlates the curve-adjusted impression quality factor categories data with a set of advertising advertiser quality criteria data to refine the estimate of the qualified impression, Q. The advertiser quality criteria data may favor or weight particular groups in particular advertising categories at particular times and contexts.

The curve adjusted impression quality factors categories generated in block 810, are compared to advertiser quality criteria data as follows. An advertiser provides impression quality criteria data for rating impression quality, Q by device type and subscriber type. In a particular illustrative embodiment, impression quality criteria data give a value of 10 points each to every television impression viewed by a woman age 35-55 with an income over $100,000, 9 points for man age 35-55 with an income over $100,000 and 8 points for woman age 35-55 with an income $50,000-$99,000. At block 814 a particular embodiment estimates a PE based on the IQF for penetration data. In a particular illustrative embodiment, the flow of function execution ends at block 816.

Figure 9:
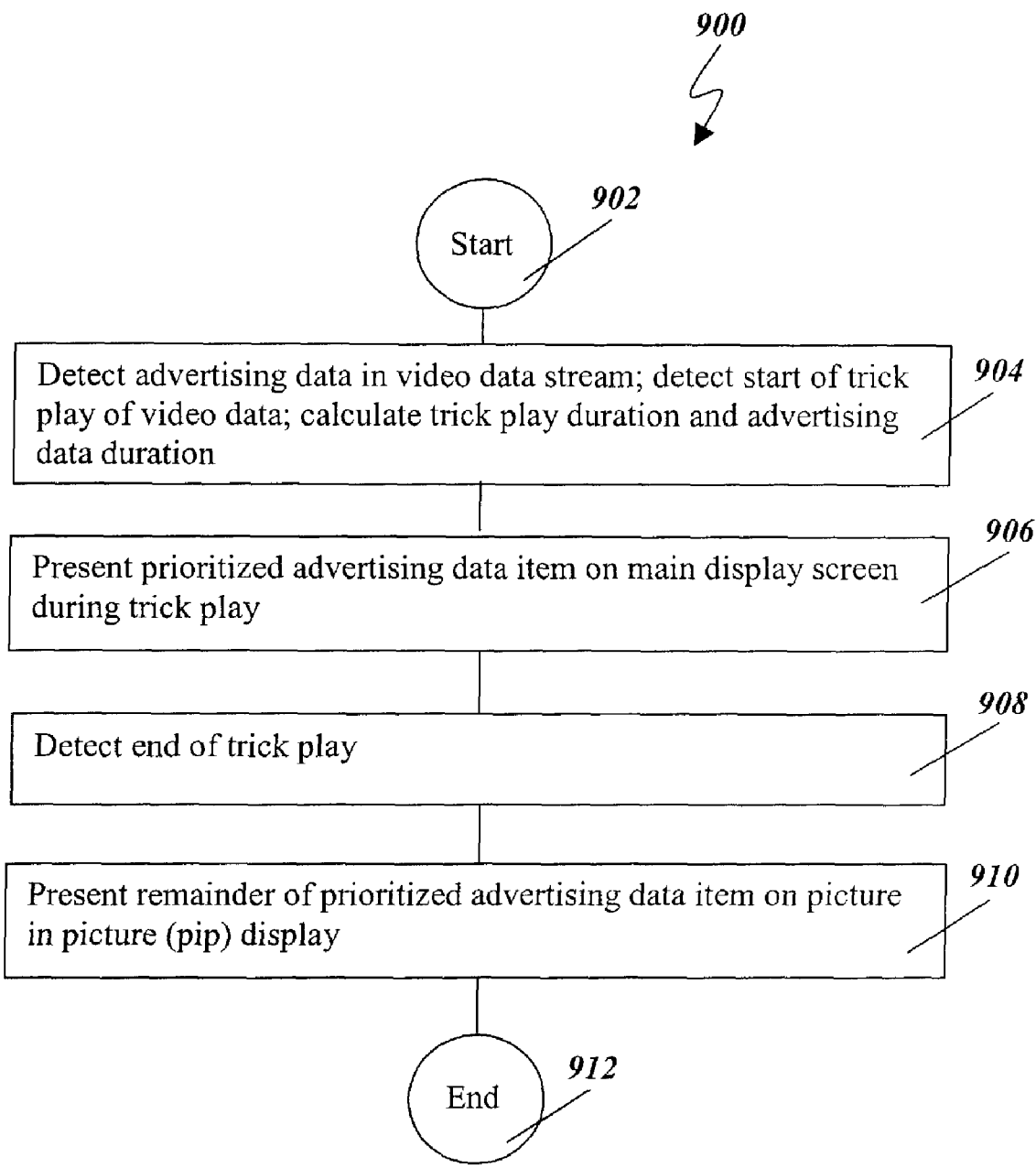
FIG. 9 depicts a flow chart of functions performed in an illustrative method for presenting prioritized data in a PIP window.

Turning now to FIG. 9, in an illustrative embodiment, a flowchart 900 of functions is performed as illustrated in FIG. 9. The execution of functions illustrated in any flow chart illustrated in this disclosure is not dictated by the order of the flow chart, including but not limited to the flow charts of FIG. 9 and FIG. 10, as the functions shown in any flow chart can be executed in any order as well as one or more functions can be left out of execution altogether in other particular embodiments. In a particular illustrative embodiment, the function execution starts at terminal 902 and proceeds to block 904, where a particular illustrative embodiment detects advertising data items in the video data stream. The advertising data items are detected at the CO level in the CO server and advertising data characterization performed in a particular illustrative embodiment at the CO level server. In another embodiment, the advertising data items are detected at the end user device level in the end user device processor and advertising data characterization performed in a particular illustrative embodiment at the end user processor. The detected advertising data items are stored in a buffer at the end-user device. An illustrative embodiment detects a start of a trick play command data for the presentation of video data. An illustrative embodiment, calculates the duration of the trick play command as well as the duration of the advertising data items detected and stored in the buffer. An illustrative embodiment then proceeds to block 906 and presents a highest prioritized advertising data item on the main display screen during trick play command execution. An illustrative embodiment then proceeds to block 908 and detects the end of the trick play command execution duration. An illustrative embodiment then proceeds to block 910 and presents the remainder of the highest priority advertising data item on a picture-in-picture (PIP) display within the main display screen. An illustrative embodiment ends at terminal 912.

Figure 10:
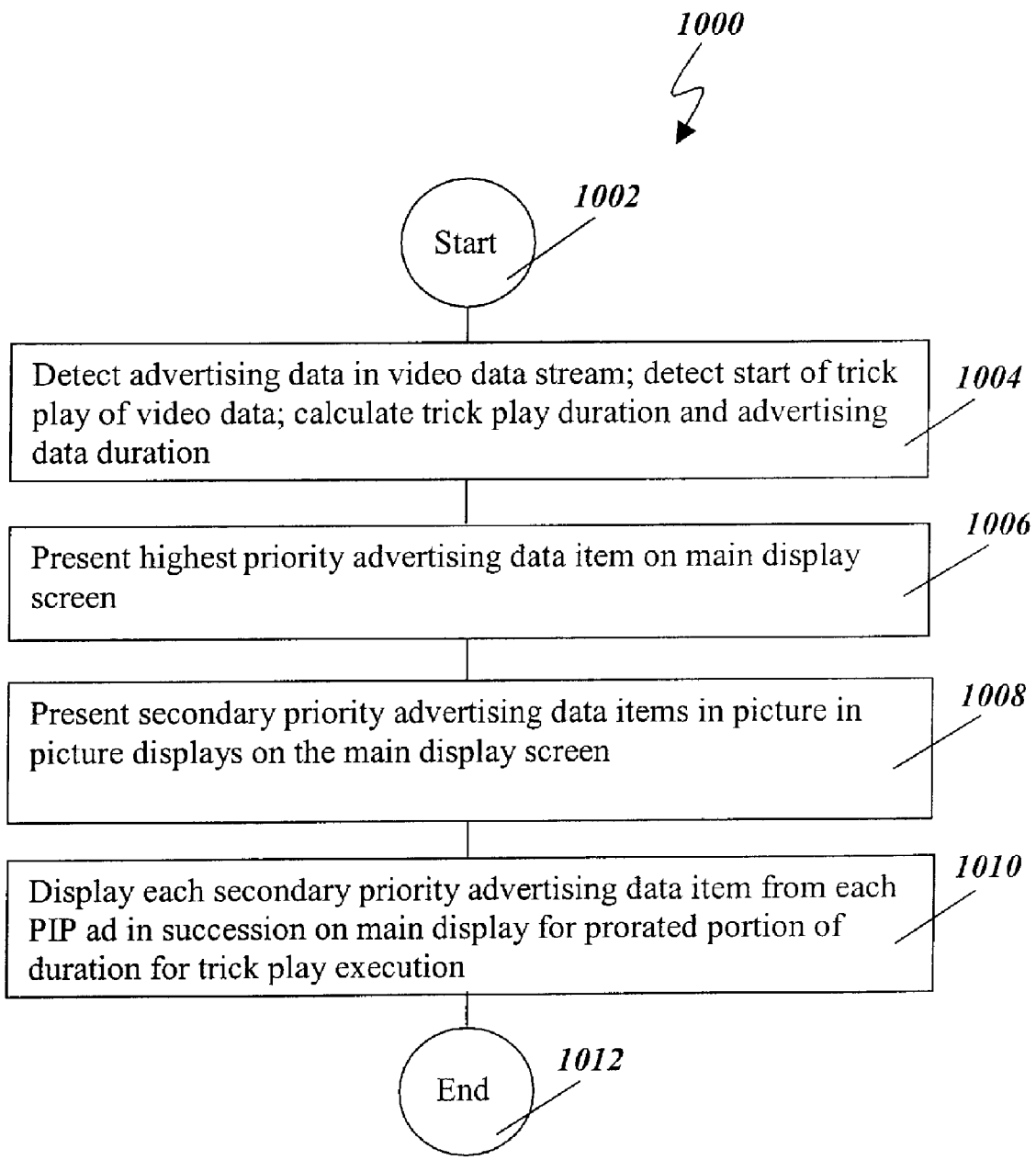
FIG. 10 depicts a flow chart of functions performed in another illustrative method for delivering advertising data.

Turning now to FIG. 10, in another particular illustrative embodiment, a flowchart of functions is performed as shown in flowchart 1000. Flowchart 1000 indicates that another particular embodiment begins execution of functions at terminal 1002 and proceeds to block 1004 and detects advertising data in the video data stream, performs advertising data prioritization and characterization and stores the advertising data as advertising data items in a buffer at the end-user device. An illustrative embodiment then calculates the trick play execution duration and the advertising data duration for the advertising data items detected in the video data stream. In another illustrative embodiment, the advertising data items are detected upstream in the IPTV system and the duration of trick play and advertising prioritization and characterization data for the advertising data items calculated upstream and sent to the end user device in a data stream. In another illustrative embodiment, the advertising data items are detected at the end user device in the IPTV system and the duration of trick play and advertising characterization data for the advertising data items calculated at the end user device.

An illustrative embodiment then proceeds to block 1006 and presents the first priority (highest priority) or primary advertising data item on the main display screen during the duration of the trick play execution. An illustrative embodiment then proceeds to block 1008 where it presents the secondary advertising data items in a PIP displays on the main display screen. An illustrative embodiment then proceeds to block 1010 and displays each secondary priority advertising data item from each PIP display in succession on the main display for a prorated portion of the duration of trick play execution command. The prorated duration can be a prorated portion of the trick-play command execution duration or a prorated portion of extended trick-play command execution duration. The prorated duration for each successive priority advertising data item is calculated based on one or more of the following factors: normal display duration for each advertising data item selected for display versus the total normal display duration of all advertising data items selected for display; comparative degree of correlation for each advertising data item between the end user profile and the advertising characterization data; and comparative costs paid by an advertiser for presentation of particular advertising data items.

Figure 11:
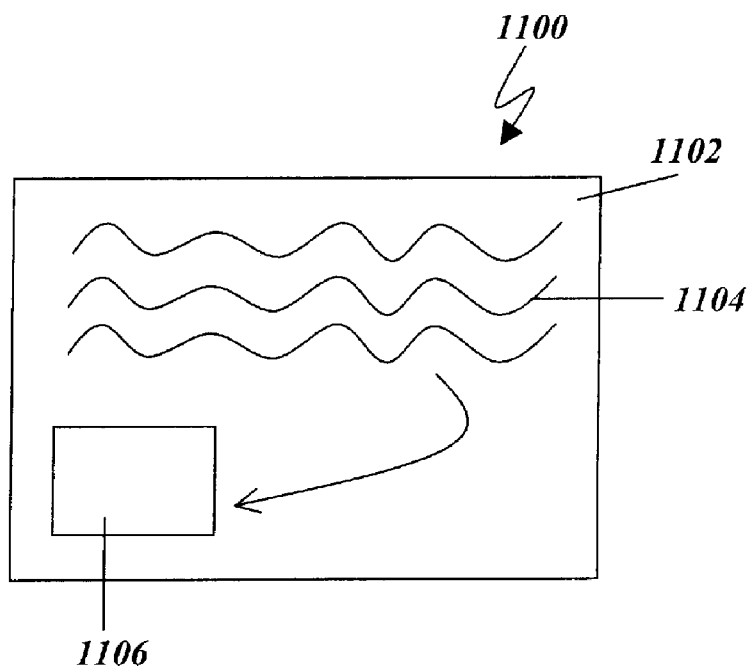
FIG. 11 is an illustration of an illustrative embodiment of an advertising data item display in which the prioritized advertising data item is displayed on a main screen during trick play and a PIP display afterwards.

Turning now to FIG. 11, in another illustrative embodiment 1100, the highest priority advertising data 1104 are presented on main display 1102 during trick play execution. After the expiration of the trick play execution duration, that is the end of the trick-play execution, which in some embodiments is extended beyond the trick-play execution duration, the highest priority advertising data remaining to be displayed is then presented in a PIP display 1106. A particular illustrative embodiment uses the advertising data queue to determine which advertising data item is present in the main display and the PIP display.

Figure 12:
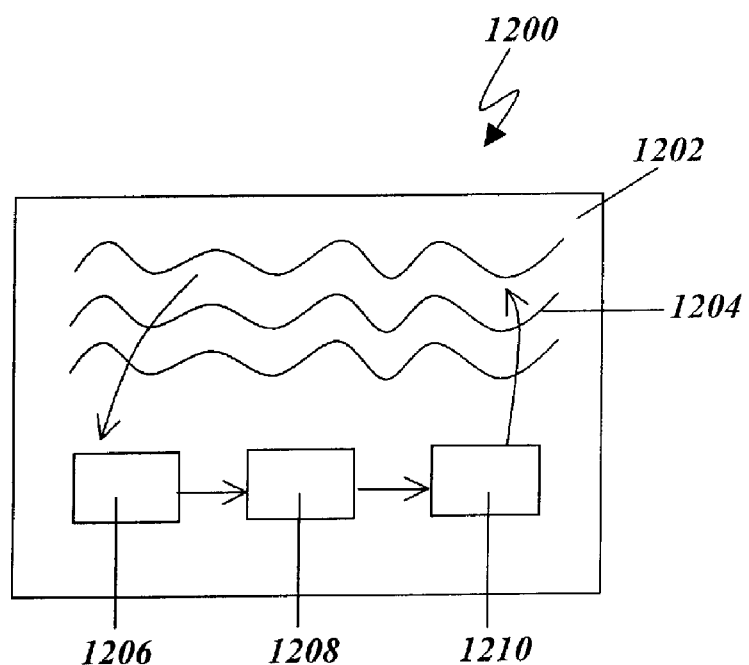
FIG. 12 is an illustration of an illustrative embodiment of an advertising display in which a plurality of prioritized advertising data items are displayed on a main screen during trick play and a picture in picture and rotated through the main screen display.

Turning now to FIG. 12, in another illustrative embodiment, a highest priority advertising data item is presented first in the main display 1202 and secondary priority advertising data items are presented alternatively in PIP windows 1206, 1208 and 1210. The secondary priority advertising data items are presented one at a time on the main display. In a particular embodiment selection of highest priority advertising data items and secondary priority advertising data items are dictated by the advertising data queue. In another embodiment, the highest priority and secondary priority advertising data items are received from the IPTV system via a data stream to the end user device (multicast or unicast) and mapped to the main display or PIP displays by the end user device based on the advertising data queue.

Figure 13:
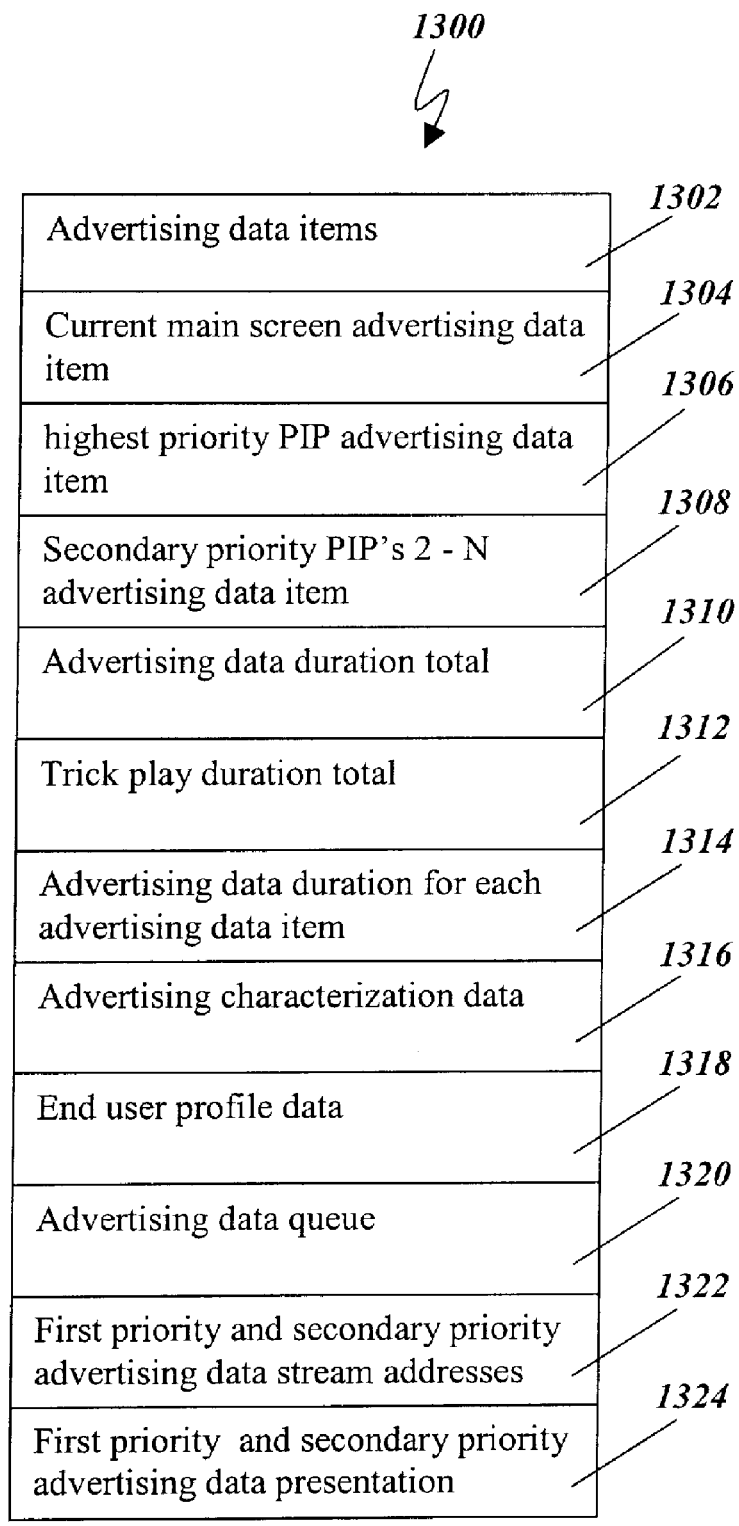
FIG. 13 is an illustration of a data structure embedded in computer readable medium.

Turning now to FIG. 13, an illustrative embodiment of a data structure 1300 embedded in computer readable memory is disclosed. As shown in FIG. 13, the data structure includes a field 1302 for containing data indicative of advertising data items. The advertising data items are associated with advertising characterization data stored in the data base. The advertising data items are detected in the incoming video data stream and stored in a buffer in memory. In an illustrative embodiment, the data structure further includes a field 1304 for containing data indicative of the advertising display data item currently displayed on main display. In another illustrative embodiment the data structure further includes a field 1306 for containing data indicative of a primary PIP advertising data item. The primary PIP advertising data item indicates the advertising data item that is presently presented in the first PIP display space 1202 on the main screen. The data structure further includes a field 1308 for containing data indicative of secondary PIP advertising data items 1-N, in PIP windows 1204, 1206 where the total number of advertising data items (primary data items plus second data items) equals N+1. The field 1308 indicates advertising data items displayed within the PIP displays 1 through N. The PIP displays of secondary advertising data items are rotated through the main screen advertising display space as described herein.

The primary advertising data item on the main display is replaced on the main display by each of the secondary advertising data items from the PIP displays one at a time. The primary data item is chosen based on a price paid to display the advertising data item and a correlation index from a correlation between the advertising characterization data for the advertising data item and end user profile data. In another illustrative embodiment, the data structure further includes a field 1310 for containing data indicative of the total duration of the primary and secondary advertising data items. In another illustrative embodiment, the data structure further includes a field 1312 for containing data indicative of the trick play duration total time. In another illustrative embodiment the data structure further includes a field 1314 for containing data indicative of the duration for each primary and secondary advertising data item. In another illustrative embodiment the data structure further includes a field 1316 for containing data indicative of the advertising characterization data for the advertising data items.

In another illustrative embodiment the data structure further includes a field 1318 for containing data indicative of the end user profile data. The end user profile data is correlated with the advertising characterization data to generate a degree of correlation or a correlative index for each primary and secondary advertising data item. In another illustrative embodiment the data structure further includes a field 1320 for containing data indicative of an advertising data queue. The advertising data queue identifies primary and secondary advertising data items for display on the main display screen and each of the PIP screens. In another illustrative embodiment the data structure further includes a field 1322 for containing data indicative of primary and secondary data stream addresses. The primary and secondary advertising data stream addresses are delivered from the IPTV system in multicast and/or unicast and joined by the end user device to receive advertising data for display of each of the PIP displays and the main display.

In a particular illustrative embodiment, the advertising data streams are mapped to the main display and PIP displays according to the advertising data queue which dynamically identifies primary and secondary data items for display on the main display screen and each of the PIP display screens. In a particular embodiment, end users receive the same advertising data stream containing the same primary and secondary data items but receive different advertising data queue data via unicast or a separate multicast address. In a particular embodiment, end users receive a different advertising data stream containing different primary and secondary data items and receive different advertising data queue data via unicast or a separate multicast address. In another illustrative embodiment the data structure further includes a field 1324 for containing data indicative of primary and secondary data presentation duration. The presentation duration dynamically indicates how long a particular primary or secondary advertising data item is presented in a particular main display or PIP window display.

The advertising data queue, primary and secondary data stream addresses and primary and secondary data presentation duration are updated dynamically. These dynamic updates are based on several factors, including but not limited to, IPTV system data transmission bandwidth available between the IPTV system and the end user device, changing advertising goals for advertisers who in turn provide different advertising data types of advertising data items thereby causing an embodiment to generate different advertising data to correlate with an end user profile for selecting an advertising data item to be presented and changes in end user profile data.

In another embodiment a system and method are provided that detect the presence of a trick play command, a PIP data stream containing primary and secondary advertising data items and a main data stream containing video data items for display at an end user device. In this particular embodiment, data indicating a queue of advertising data items is transmitted over the PIP data stream. The queue contains data that identifies primary and secondary advertising data items for display in PIP and main display areas of an end user device display. The advertising data may be the same or different for different individual users. In a particular embodiment, the advertising data is sent via multicast to a group of end user devices. In a particular embodiment, the advertising data is sent via unicast to each of a group of end user devices. In another embodiment, an advertising data queue is sent to each end user device to direct presentation in PIP and main screen display of primary and secondary data items in the advertising data delivered by multicast.

Figure 14:
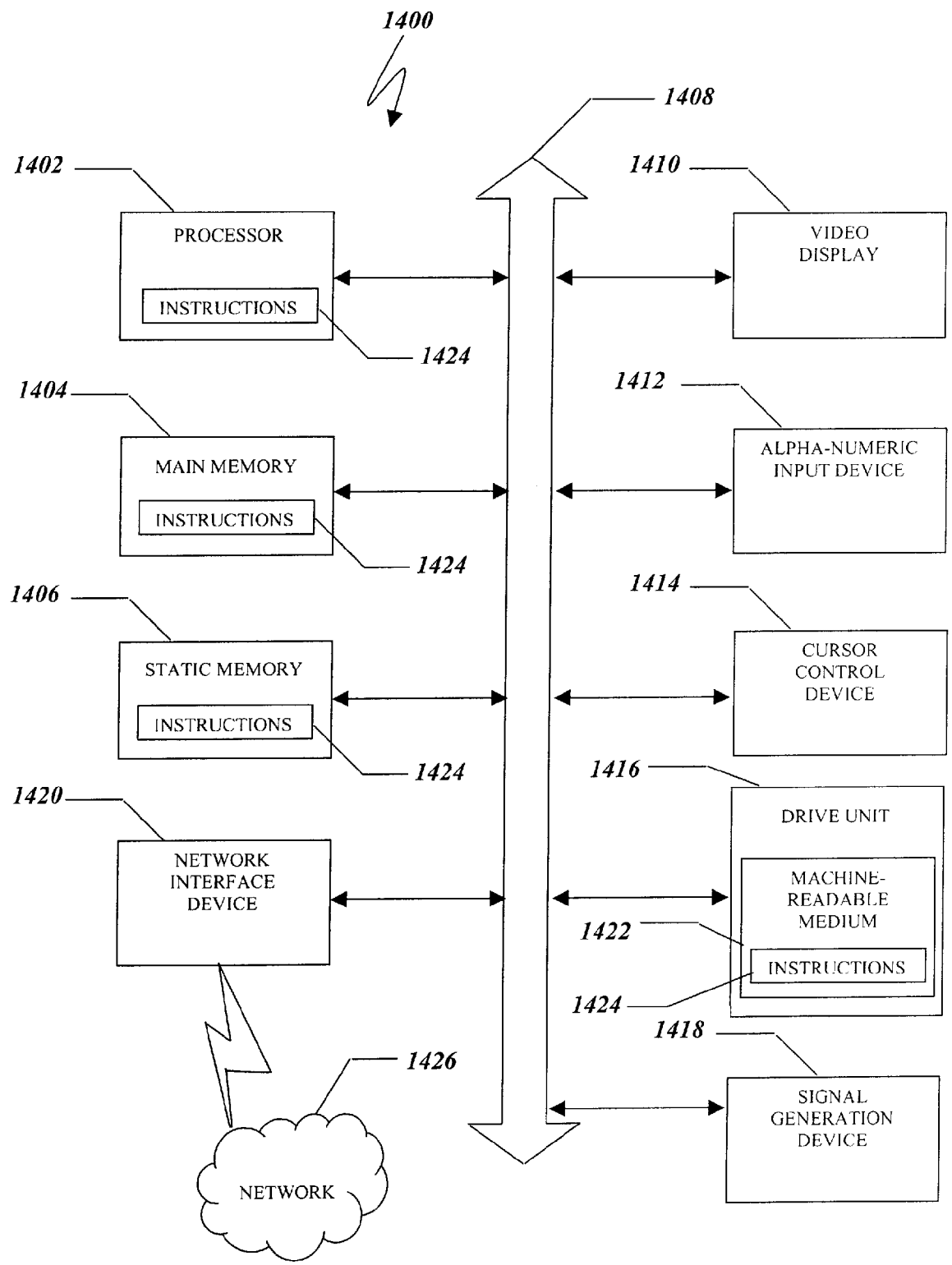
FIG. 14 depicts an illustrative embodiment of a machine for performing functions disclosed in an illustrative embodiment.

FIG. 14 is a diagrammatic representation of a machine in the form of a computer system 1400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., liquid crystals display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface.

The disk drive unit 1416 may include a machine-readable medium 1422 on which is stored one or more sets of instructions (e.g., software 1424) embodying any one or more of the methodologies or functions described herein, including those methods illustrated in herein above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420. The machine readable medium may also contain a data structure for containing data useful in providing a functional relationship between the data and a machine or computer in an illustrative embodiment of the disclosed system and method.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable medium containing computer executable instructions that when executed by a computer perform a method, the computer program comprising:
    instructions to receive trick play command data at an end user device;
    instructions to receive advertising data at the end user device;
    instructions to track a portion of the advertising data forwarded from the first end user device to a second end user;
    instructions to generate, based on the tracking, penetration data indicating an extent to which the first end user device forwards and propagates the portion of the advertising data to other end users;
    instructions to correlate the advertising data with penetration data for the first end user associated with the first end user device;
    instructions to prioritize the advertising data for the end user device based on the correlation; and
    instructions to present a portion of the advertising data in a picture in picture display window on the end user device based on the prioritizing of the advertising data during execution of the trick play command data.

2. The medium of claim 1, wherein the advertising penetration data further comprises advertising data tracked in at least one of a telephone call in which the first end user includes a reference to the advertising data in the telephone call between the first end user device and another end user device.

3. The method of claim 2, wherein the penetration data further comprises at least one data set selected from the group consisting of advertising forwarding data and advertising discussion data for the end user.

4. The method of claim 2, wherein the penetration data further comprises penetration effectivity data based on impression quality factors for the advertising data forwarded by the end user.

5. The method of claim 4, wherein the correlating further comprises finding a penetration data category that matches one of the advertising data keys.

6. The method of claim 2, wherein the advertising data further comprises penetration category data for correlating with subscriber activity data for the end user.

7. A system comprising:
    a processor in data communication with a computer readable medium; and
    a computer program embedded in the computer readable medium comprising computer executable instructions for execution by the processor, the computer program comprising instructions to receive trick play command data at an end user device, instructions to receive a advertising data at the end user device,
    instructions to track a portion of the advertising data forwarded from the first end user device to a second end user;
    instructions to generate, based on the tracking, penetration data indicating an extent to which the first end user device forwards and propagates the portion of the advertising data to other end users;
    instructions to correlate the advertising data with the penetration data for an end user associated with the end user device, instructions to prioritize the advertising data for the end user device based on the correlation and instructions to present a portion of the advertising data in a picture in picture display window on the end user device based on the prioritizing of the advertising data during execution of the trick play command data.

8. The system of claim 7, wherein the advertising data further comprises advertising data keys.

9. The system of claim 7, wherein the penetration data further comprises at least one data set selected from the group consisting of advertising forwarding data and advertising discussion data for the end user.

10. The system of claim 7, wherein the penetration data further comprises penetration effectivity data based on impression quality factors for the advertising data forwarded by the end user.

11. The system of claim 10, wherein the instructions to correlate further comprise instructions to find a penetration data category that matches one of the advertising data keys.

12. The system of claim 8, wherein the penetration data further comprises penetration category data for correlating with subscriber activity data for the end user.

13. A non-transitory computer readable medium, containing a data structure for containing data useful by a processor in determining what advertising data to send, the data structure comprising:
- a first field for containing data indicative of a trick play command data for execution at an end user device; and
- a second field for containing data indicative of prioritized advertising data based on penetration data for an end user associated with the end user device for presentation in a picture in picture display window at the end user device during execution of the trick play command data wherein the penetration data is generated based on tracking the penetration data indicating an extent to which a first end user device forwards and propagates a portion of advertising data to other end user devices.

14. The medium of claim 13, the data structure further comprising:
- a third field for containing data indicative of the penetration data for the end user associated with the end user device.

15. The medium of claim 14, the data structure further comprising:
- a fourth field for containing data indicative of advertising data key data for correlation with the penetration data for prioritizing the advertising data.

16. The medium of claim 15, the data structure further comprising a fifth field for containing data indicative of advertising forwarding data for advertising data forwarded by the first end user device to other end user devices.

17. The medium of claim 16, the data structure further comprising a sixth field for containing data indicative of advertising discussion data for advertising data discussed by the end user at the first end user device with other end users at other end user devices.

18. The medium of claim 17, the data structure further comprising a seventh field for containing data indicative of penetration category data for the end user device.

* * * * *